(12) United States Patent
Kim et al.

(10) Patent No.: US 11,996,631 B2
(45) Date of Patent: May 28, 2024

(54) ANTENNA SYSTEM MOUNTED IN VEHICLE

(71) Applicant: LG ELECTRONICS INC., Seoul (KR)

(72) Inventors: Changil Kim, Seoul (KR); Seungwoo Ryu, Seoul (KR); Joohee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 149 days.

(21) Appl. No.: 17/754,648

(22) PCT Filed: Oct. 14, 2019

(86) PCT No.: PCT/KR2019/013404
§ 371 (c)(1),
(2) Date: Apr. 7, 2022

(87) PCT Pub. No.: WO2021/075588
PCT Pub. Date: Apr. 22, 2021

(65) Prior Publication Data
US 2023/0099552 A1   Mar. 30, 2023

(51) Int. Cl.
*H01Q 1/32*   (2006.01)
*H01Q 1/36*   (2006.01)
(Continued)

(52) U.S. Cl.
CPC .......... *H01Q 5/307* (2015.01); *H01Q 1/3275* (2013.01); *H01Q 1/36* (2013.01); *H01Q 1/48* (2013.01);
(Continued)

(58) Field of Classification Search
CPC .......... H01Q 1/32; H01Q 1/3275; H01Q 1/36; H01Q 1/42; H01Q 1/48; H01Q 3/44;
(Continued)

(56) References Cited

U.S. PATENT DOCUMENTS

2017/0069950 A1*   3/2017   Kim .................... H01Q 1/32

FOREIGN PATENT DOCUMENTS

| JP | 2019505119 | 2/2019 |
|----|------------|--------|
| JP | 2019515568 | 6/2019 |

(Continued)

OTHER PUBLICATIONS

PCT International Application No. PCT/KR2019/013404, International Search Report dated Jul. 10, 2020, 2 pages.

*Primary Examiner* — Hoang V Nguyen
(74) *Attorney, Agent, or Firm* — LEE, HONG, DEGERMAN, KANG & WAIMEY

(57) ABSTRACT

An antenna system mounted in a vehicle according to the present invention comprises: a metal plate that forms a part of the exterior of the antenna system and operates as a radiator; a lower substrate disposed on the lower portion of the metal plate; and a first antenna comprising a feeding part disposed on the front surface of the lower substrate and configured to transmit a signal to the metal plate through a metal supporter, and a shorting pin configured to connect the ground of the lower substrate and the metal plate. In addition, the system comprises a second antenna that is disposed in the antenna system and is separately provided from the first antenna.

19 Claims, 24 Drawing Sheets

(51) Int. Cl.
*H01Q 1/48* (2006.01)
*H01Q 5/307* (2015.01)
*H01Q 9/04* (2006.01)
*H04B 7/0413* (2017.01)

(52) U.S. Cl.
CPC ......... *H01Q 9/0421* (2013.01); *H04B 7/0413* (2013.01)

(58) Field of Classification Search
CPC .......... H01Q 5/307; H01Q 5/392; H01Q 5/40; H01Q 9/40; H01Q 15/24; H01Q 17/00; H01Q 21/061; H01Q 21/28
See application file for complete search history.

(56) References Cited

FOREIGN PATENT DOCUMENTS

| | | |
|---|---|---|
| KR | 101694261 | 1/2017 |
| KR | 101850061 | 6/2018 |
| KR | 1020180096280 | 8/2018 |

\* cited by examiner (a)

(b)

ANTENNA SYSTEM MOUNTED IN VEHICLE

CROSS-REFERENCE TO RELATED APPLICATIONS

This application is the National Stage filing under 35 U.S.C. 371 of International Application No. PCT/KR2019/013404, filed on Oct. 14, 2019, the contents of which are all incorporated by reference herein in their entirety.

TECHNICAL FIELD

The present disclosure relates to an antenna system mounted in a vehicle. One particular implementation relates to an antenna system having a broadband antenna that is capable of operating in various communication systems, and to a vehicle having the same.

BACKGROUND ART

Electronic devices may be divided into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mm-Wave) band in addition to the Sub-6 band for a faster data rate.

Recently, the necessity of providing such a communication service through a vehicle is increasing. Meanwhile, there is a need for a fifth generation (5G) communication service, which is a next generation communication service, as well as existing communication services such as LTE (Long Term Evolution) and the like in relation to communication services.

Accordingly, broadband antennas operating in both the LTE frequency bands and the 5G Sub6 frequency bands need to be disposed in a vehicle other than an electronic device. However, broadband antennas such as cone antennas have problems in that a vertical profile and a weight increase due to an increase in an overall antenna size, particularly, a height.

In addition, the broadband antennas such as the cone antennas may be implemented in a three-dimensional structure compared to related art planar antennas. In addition, multiple-input/multi-output (MIMO) should be implemented in an electronic device or vehicle to improve communication reliability and communication capacity. To this end, it is necessary to arrange a plurality of broadband antennas in the electronic device or vehicle.

This causes a problem that any detailed arrangement structure has not been taught to arrange cone antennas having such a three-dimensional structure in an electronic device or vehicle while maintaining a low interference level among the cone antennas.

In addition, it is necessary to improve antenna performance while maintaining a low profile structure in the three-dimensional antenna system. However, in the three-dimensional antenna system, a mechanical structure for fixing the antenna in a vehicle is required while securing a height of an antenna itself. This may cause a problem that the antenna performance should be improved while maintaining the mechanical structure to be equal to or lower than a predetermined height.

When the antenna system is disposed in the vehicle, a plurality of antennas may be disposed. Among these antennas, antennas operating in a low band (LB) of 600 MHz to 960 MHz have a difficulty in satisfying performance in the corresponding band. Therefore, it is necessary to design an optimal antenna that allows the antennas operating in the low band LB to operate in a broad band.

DISCLOSURE OF INVENTION

Technical Problem

The present disclosure is directed to solving the aforementioned problems and other drawbacks. The present disclosure also describes improvement of antenna system while maintaining a height of an antenna system mounted in a vehicle to be lower than or equal to a predetermined level.

The present disclosure further describes a structure for mounting an antenna system, which is capable of operating in a broad band to support various communication systems, in a vehicle.

The present disclosure further describes a planar antenna having various structures, which can operate in a low band LB.

The present disclosure further describes optimized antenna performance according to various structures in a planar antenna having such various structures, which can operate in a low band LB.

Solution to Problem

To achieve those aspects of the subject matter disclosed herein, there is provided with an antenna system mounted in a vehicle that may include a metal plate defining a part of the exterior of the antenna system and operating as a radiator, a lower substrate disposed under the metal plate, a feeder disposed on a front surface of the lower substrate and configured to transmit a signal to the metal plate through a metal supporter, and a first antenna comprising a shorting pin configured to connect a ground of the lower substrate and the metal plate. In addition, the antenna system may further include a second antenna that is disposed in the antenna system, separately from the first antenna, such that antenna performance can be improved while the height of the antenna system mounted in the vehicle is maintained at a predetermined level or lower by using a metal on the exterior of an antenna module.

According to one implementation, the antenna system may further include a transceiver circuit configured to control a signal to be radiated through at least one of the first antenna and the second antenna.

According to one implementation, the first antenna may further include a second metal plate disposed adjacent to the metal plate for coupling of a signal from the metal plate, the second metal plate configured such that the first antenna operates in a broad band.

According to one implementation, the second metal plate may be connected to a cone radiator disposed under the second metal plate.

According to one implementation, the antenna system may further include a first cover disposed between the second metal plate and the cone radiator to increase a height of the first antenna as the second metal plate is separated from the cone radiator, so as to improve performance of the first antenna.

According to one implementation, the antenna system may further include a second cover disposed to enclose the cone radiator under the cone radiator.

According to one implementation, the second metal plate, the first cover, and outer rims integrally formed with the cone radiator may be connected together by screws coupled from an upper portion of the second metal plate.

According to one implementation, the second metal plate, outer rims integrally formed with the cone radiator, and the second cover may be connected together by screws coupled from an upper portion of the second metal plate.

According to one implementation, the second metal plate and outer rims integrally formed with the cone radiator may be connected to each other by screws coupled from an upper portion of the second metal plate, and an upper aperture of the cone radiator may be covered by the second metal plate without a dielectric.

According to one implementation, the antenna system may further include a shorting bar configured to connect the shorting pin and the feeder disposed on the metal plate. The shorting bar may be connected to the metal supporter of the feeder and the shorting pin, and to one point in the metal plate.

According to one implementation, the shorting bar may be connected to a screw boss formed on the one point in the metal plate.

According to one implementation, the shorting bar may include a connection part connected to the one point in the metal plate, extension parts formed by being bent from the connection part at predetermined angles, and fastening parts formed at ends of the extension parts to be fastened to the shorting pin and the metal supporter.

According to one implementation, a position where the metal plate is disposed may be higher than a position where the second metal plate is disposed, and a position where a lower substrate connected with a lower aperture of a cone radiator with being spaced apart from the second metal plate is disposed may be lower than a position where a lower plate of the metal plate is disposed, so as to secure a predetermined height of the cone radiator.

According to one implementation, the second metal plate may be connected to a cone radiator or a pyramid radiator, and the second metal plate may include a plurality of second type screw bosses and a plurality of third type screw bosses to be connected with the cone radiator and the pyramid radiator.

According to one implementation, the second antenna may include a plurality of cone antennas including cone radiators and patch antennas. The antenna system may further include a baseband processor configured to perform Multi-Input/Multi-Output (MIMO) through the plurality of cone antennas, and the baseband processor may perform MIMO through the first antenna and at least one of the plurality of cone antennas.

According to one implementation, the first antenna may operate as a radiator in a low band as a first frequency band, and the second antenna may operate as a radiator in a second frequency band higher than the first frequency band. The antenna system may further include a baseband processor configured to perform Carrier Aggregation (CA) by receiving a first signal of the first frequency band through the first antenna and a second signal of the second frequency band through the second antenna.

According to another aspect of the subject matter disclosed herein, there is provided a vehicle having an antenna assembly. The vehicle may include a metal plate defining a part of the exterior of the antenna system and operating as a radiator, a lower substrate disposed under the metal plate, a feeder disposed on a front surface of the lower substrate and configured to transmit a signal to the metal plate through a metal supporter, and a first antenna comprising a shorting pin configured to connect a ground of the lower substrate and the metal plate. The vehicle may further include a second antenna disposed in the antenna system, separately from the first antenna. The vehicle may further include a transceiver circuit configured to control a signal to be radiated through at least one of the first antenna and the second antenna. The vehicle may further include a baseband processor configured to communicate with at least one of an adjacent vehicle, a Road Side Unit (RSU), and a base station through the transceiver circuit.

According to one implementation, the first antenna may further include a second metal plate disposed adjacent to the metal plate for coupling of a signal from the metal plate, the second metal plate configured such that the first antenna operates in a broad band.

According to one implementation, the second metal plate may be connected to a cone radiator disposed under the second metal plate, and the first antenna may further include a first cover disposed between the second metal plate and the cone radiator to increase a height of the first antenna as the second metal plate is separated from the cone radiator, so as to improve performance of the first antenna.

According to one implementation, the antenna system may further include a shorting bar configured to connect the shorting pin and the feeder disposed on the metal plate. The shorting bar may be connected to the metal supporter of the feeder and the shorting pin, and additionally to one point in the metal plate.

According to one implementation, the first antenna may operate as a radiator in a low band as a first frequency band, and the second antenna may operate as a radiator in a second frequency band higher than the first frequency band. The antenna system may further include a baseband processor configured to perform Carrier Aggregation (CA) by receiving a first signal of the first frequency band through the first antenna and a second signal of the second frequency band through the second antenna.

Advantageous Effects of Invention

Hereinafter, technical effects of an antenna structure using the exterior of a module in an antenna system mounted in a vehicle and a vehicle equipped with the antenna system will be described.

According to an implementation, antenna performance can be improved while maintaining the height of an antenna system mounted in a vehicle to be a predetermined level or lower, by using the exterior of a metal of an antenna module.

According to an implementation, a structure for mounting an antenna system, which can operate in a broad band, in a vehicle can be provided to support various communication systems by implementing a low band (LB) antenna and other antennas in one antenna module.

According to an implementation, a planar antenna of various structures which can operate in a low band LB can be provided by coupling a shorting bar as well as a shorting pin to a metal plate.

According to an implementation, the antenna system can be optimized with different antennas in the low band LB and other bands. This can result in arranging the antenna system with optimal configuration and performance in a roof frame of the vehicle.

According to an implementation, the antenna system of the vehicle can implement MIMO and diversity operations using a plurality of antennas in specific bands.

According to an implementation, a planar antenna of various structures which can operate in a low band LB can provide optimized antenna performance according to various structures of a shorting bar, by coupling the shorting bar to a metal plate in the various structures and shapes.

MODE FOR THE INVENTION

Figure 1:
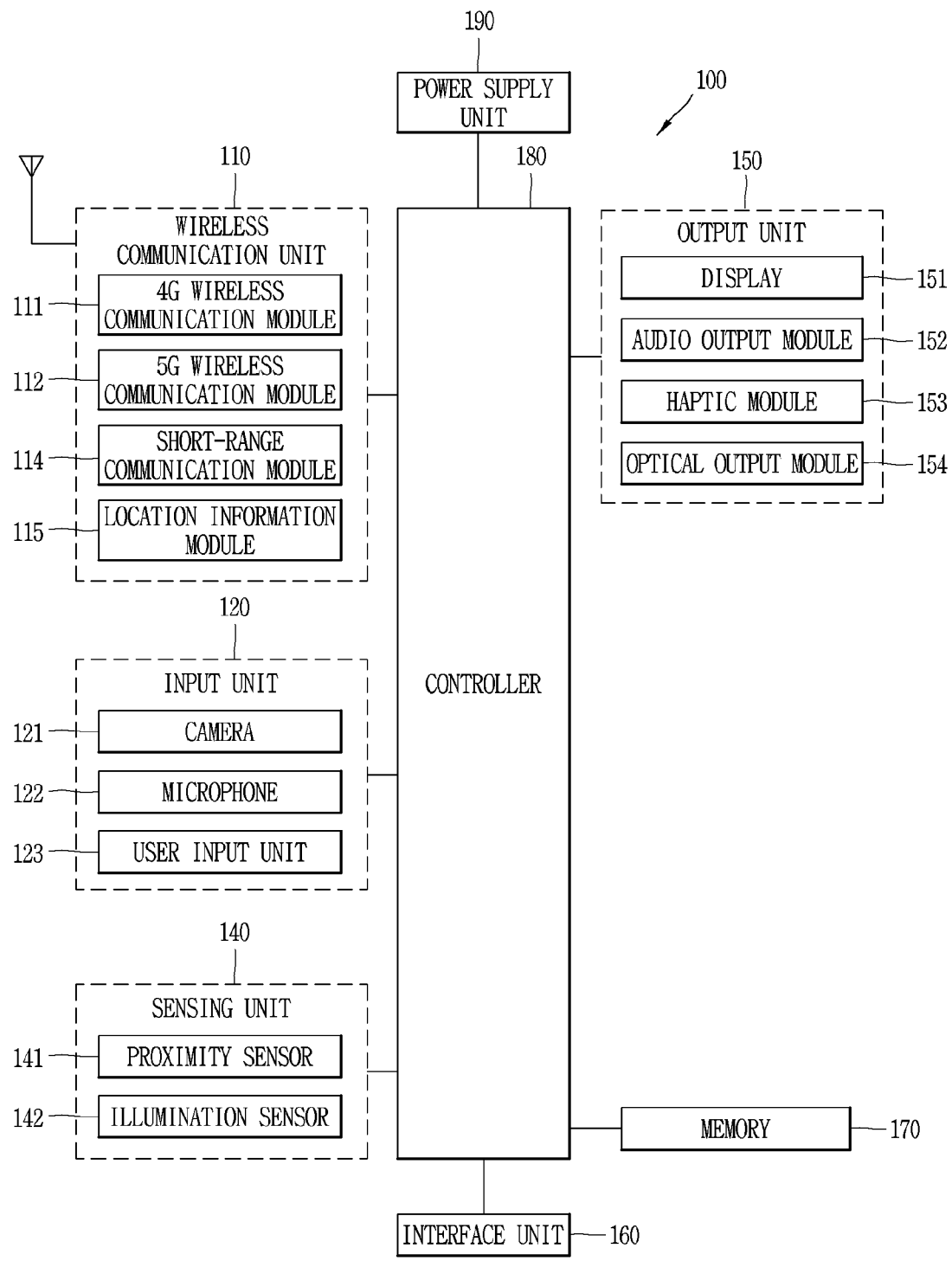
FIG. 1 is a block diagram of an electronic device in accordance with the present disclosure.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

On the other hand, an antenna system mounted in a vehicle disclosed in this specification mainly refers to an antenna system disposed on an outside of the vehicle, but may also include a mobile terminal (electronic device) belonging to a user aboard the vehicle.

FIG. 1 is a block diagram of an electronic device in accordance with the present disclosure. Here, the electronic device may include a mobile terminal (electronic device) disposed inside the vehicle or carried by a user who is on board the vehicle. Also, a vehicle in which a communication system such as an antenna system is mounted may be referred to as an electronic device.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components illustrated in FIG. 1 is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperably operate to implement an operation, a control or a control method of an electronic device according to various implementations disclosed herein. Also, the operation, the control or the control method of the portable electronic device may be implemented on the portable electronic device by an activation of at least one application program stored in the memory 170.

Figure 2A:
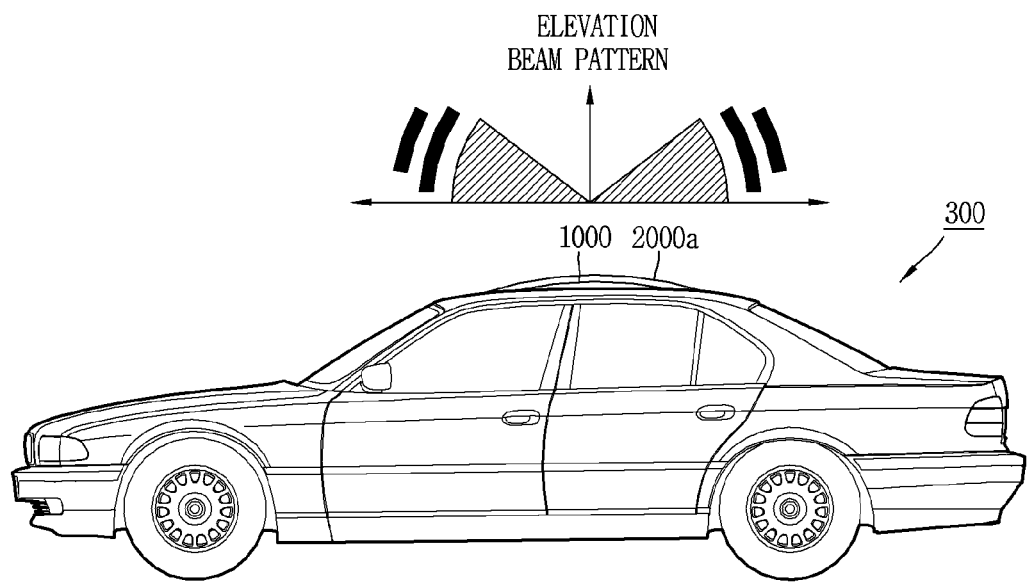
FIGS. 2A to 2C are views illustrating an example of a structure for mounting an antenna system in a vehicle, which includes the antenna system mounted in the vehicle.
Figure 2B:
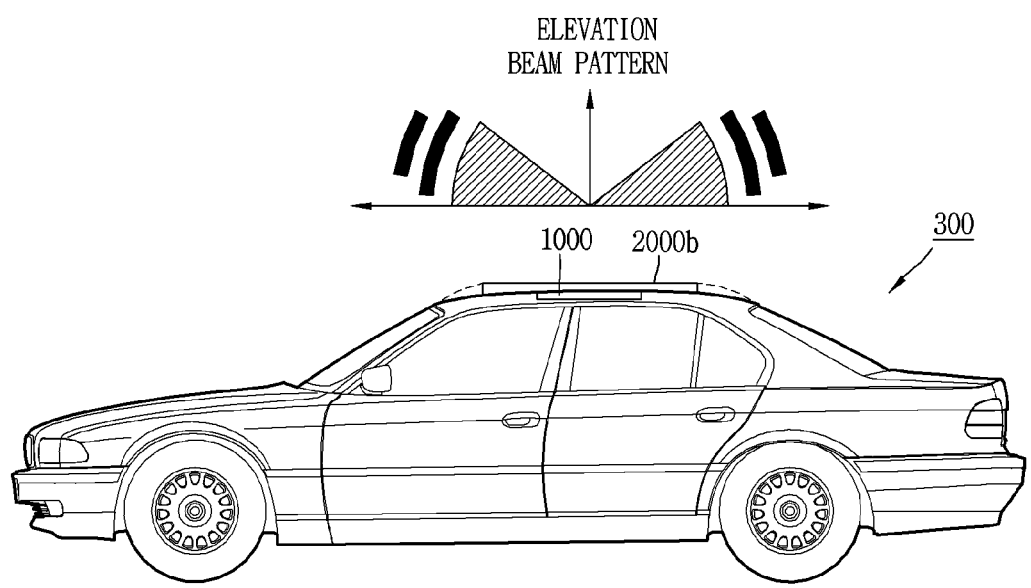
Figure 2C:
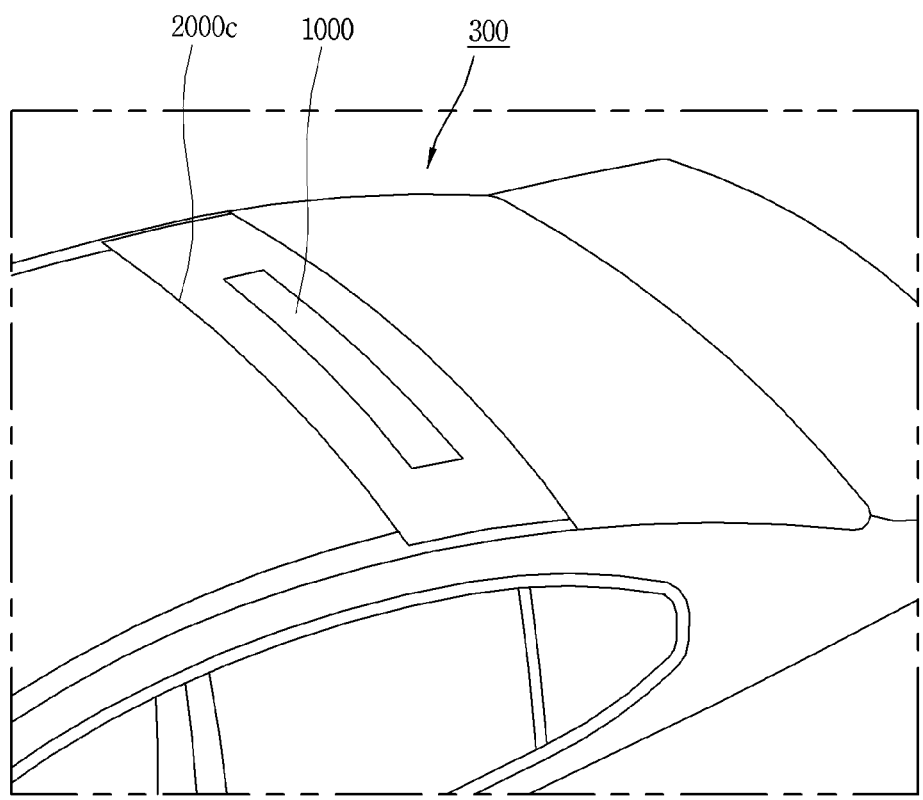

FIGS. 2A to 2C are views illustrating an example of a structure for mounting an antenna system in a vehicle, which includes the antenna system mounted in the vehicle. In this regard, FIGS. 2A and 2B illustrate a configuration in which an antenna system 1000 is mounted on or in a roof of a vehicle. Meanwhile, FIG. 2C illustrates a structure in which the antenna system 1000 is mounted in a roof of the vehicle and a roof frame of a rear mirror.

Referring to FIGS. 2A to 2C, in order to improve the appearance of the vehicle and to maintain a telematics performance at the time of collision, an existing shark fin antenna is replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 2A, the antenna system 1000 may be disposed on the roof of the vehicle. In FIG. 2A, a radome 2000a for protecting the antenna system 1000 from an external environment and external impacts while the vehicle travels may cover the antenna system 1000. The radome 2000a may be made of a dielectric material through which radio signals are transmitted/received between the antenna system 1000 and a base station.

Referring to 2B, the antenna system 1000 may be disposed within a roof structure 2000b of the vehicle, and at least part of the roof structure 2000b may be made of a non-metallic material. At this time, the at least part of the roof structure 2000b of the vehicle may be realized as the non-metallic material, and may be made of a dielectric material through which radio signals are transmitted/received between the antenna system 1000 and the base station.

Also, referring to 2C, the antenna system 1000 may be disposed within a roof frame 2000c of the vehicle, and at least part of the roof frame 200c may be made of a non-metallic material. At this time, the at least part of the roof frame 2000c of the vehicle may be realized as the non-metallic material, and may be made of a dielectric material through which radio signals are transmitted/received between the antenna system 1000 and the base station.

Figure 3:
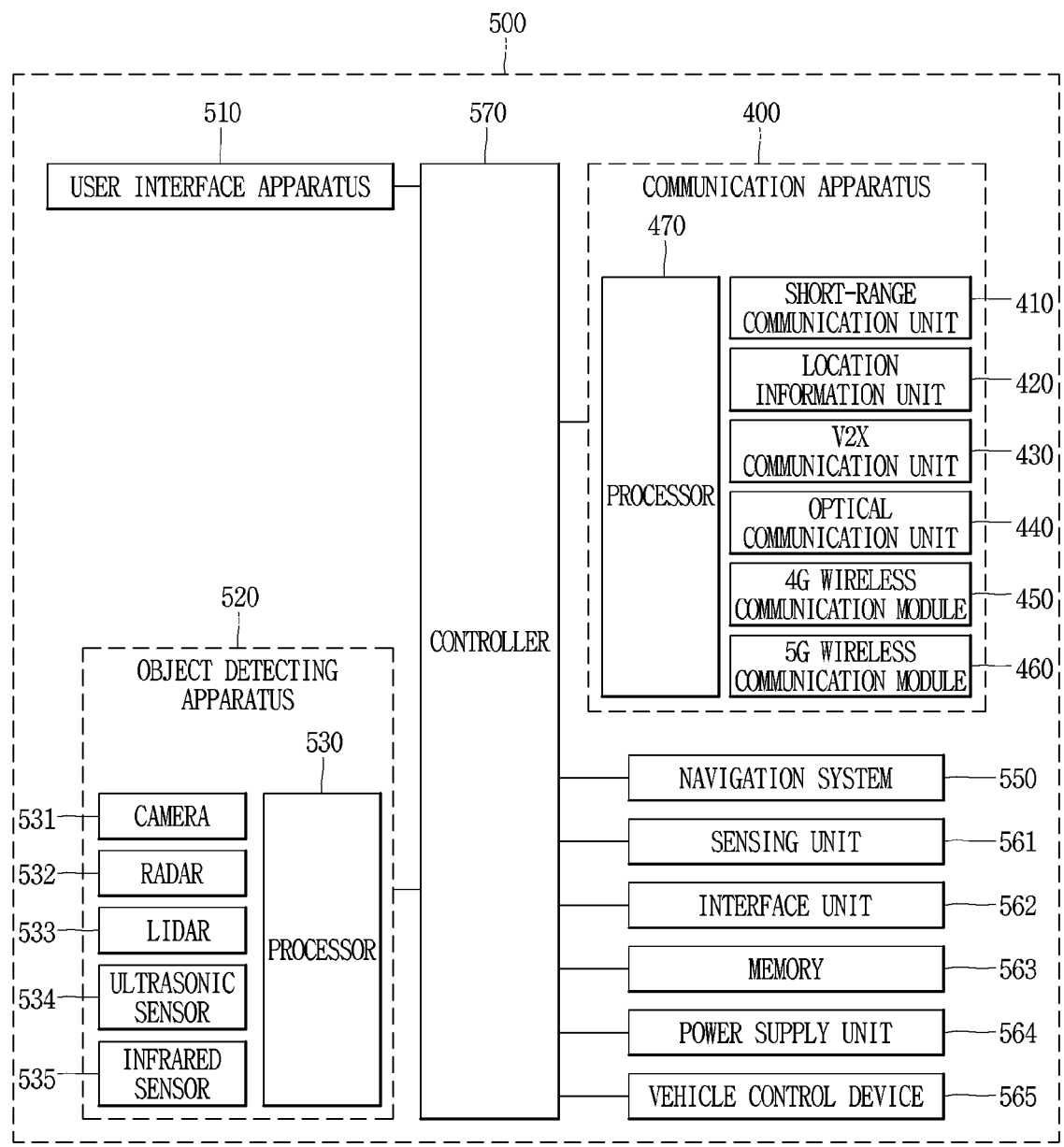
FIG. 3 is a block diagram illustrating a vehicle in accordance with an implementation.

Meanwhile, the antenna system 1000 may be installed on a front or rear surface of the vehicle depending on applications, other than the roof structure or roof frame of the vehicle. FIG. 3 is a block diagram illustrating a vehicle in accordance with an implementation of the present disclosure.

As illustrated in FIGS. 2 and 3, a vehicle 300 may include wheels turning by a driving force, and a steering apparatus 510 for adjusting a driving (ongoing, moving) direction of the vehicle 300.

The vehicle 300 may be an autonomous vehicle. The vehicle 300 may be switched into an autonomous mode or a manual mode based on a user input. For example, the vehicle 300 may be switched from the manual mode into the autonomous driving mode or from the autonomous driving mode into the manual mode based on a user input received through a user interface apparatus 310.

The vehicle 300 may be switched into the autonomous mode or the manual mode based on driving environment information. The driving environment information may be generated based on object information provided from an object detecting apparatus 320. For example, the vehicle 300 may be switched from the manual mode into the autonomous mode or from the autonomous mode into the manual mode based on driving environment information generated in the object detecting apparatus 320.

In an example, the vehicle 300 may be switched from the manual mode into the autonomous mode or from the autonomous module into the manual mode based on driving environment information received through a communication apparatus 400. The vehicle 300 may be switched from the manual mode into the autonomous mode or from the autonomous module into the manual mode based on information, data or signal provided from an external device.

When the vehicle 300 is driven in the autonomous mode, the autonomous vehicle 300 may be driven based on an operation system. For example, the autonomous vehicle 300 may be driven based on information, data or signal generated in a driving system, a parking exit system, and a parking system.

When the vehicle 300 is driven in the manual mode, the autonomous vehicle 300 may receive a user input for driving through a driving control apparatus. The vehicle 300 may be driven based on the user input received through the driving control apparatus.

An overall length refers to a length from a front end to a rear end of the vehicle 300, a width refers to a width of the vehicle 300, and a height refers to a length from a bottom of a wheel to a roof. In the following description, an overall-length direction L may refer to a direction which is a criterion for measuring the overall length of the vehicle 300, a width direction W may refer to a direction that is a criterion for measuring a width of the vehicle 300, and a height direction H may refer to a direction that is a criterion for measuring a height of the vehicle 300.

As illustrated in FIG. 2, the vehicle 300 may include a user interface apparatus 310, an object detecting apparatus 320, a navigation system 350, and a communication device 400. In addition, the vehicle may further include a sensing unit 361, an interface unit 362, a memory 363, a power supply unit 364, and a vehicle control device 365 in addition to the aforementioned apparatuses and devices. Here, the sensing unit 361, the interface unit 362, the memory 363, the power supply unit 364, and the vehicle control device 365 may have low direct relevance to wireless communication through the antenna system 1000 according to the present disclosure. So, a detailed description thereof will be omitted herein.

According to implementations, the vehicle 300 may include more components in addition to components to be explained in this specification or may not include some of those components to be explained in this specification.

The user interface apparatus 310 may be an apparatus for communication between the vehicle 300 and a user. The user interface apparatus 310 may receive a user input and provide information generated in the vehicle 300 to the user. The vehicle 310 may implement user interfaces (UIs) or user experiences (UXs) through the user interface apparatus 200.

The object detecting apparatus 320 may be an apparatus for detecting an object located at outside of the vehicle 300. The object may be a variety of objects associated with driving (operation) of the vehicle 300. In some examples, objects may be classified into moving objects and fixed (stationary) objects. For example, the moving objects may include other vehicles and pedestrians. The fixed objects may include traffic signals, roads, and structures, for example.

The object detecting apparatus 320 may include a camera 321, a radar 322, a LiDAR 323, an ultrasonic sensor 324, an infrared sensor 325, and a processor 330.

According to an implementation, the object detecting apparatus 320 may further include other components in addition to the components described, or may not include some of the components described.

The processor 330 may control an overall operation of each unit of the object detecting apparatus 320. The processor 330 may detect an object based on an acquired image, and track the object. The processor 330 may execute operations, such as a calculation of a distance from the object, a calculation of a relative speed with the object and the like, through an image processing algorithm.

The processor 330 may detect an object based on a reflected electromagnetic wave which an emitted electromagnetic wave is reflected from the object, and track the object. The processor 330 may execute operations, such as a calculation of a distance from the object, a calculation of a relative speed with the object and the like, based on the electromagnetic wave.

The processor 330 may detect an object based on a reflected laser beam which an emitted laser beam is reflected from the object, and track the object. The processor 330 may execute operations, such as a calculation of a distance from the object, a calculation of a relative speed with the object and the like, based on the laser beam.

The processor 330 may detect an object based on a reflected ultrasonic wave which an emitted ultrasonic wave is reflected from the object, and track the object. The processor 330 may execute operations, such as a calculation of a distance from the object, a calculation of a relative speed with the object and the like, based on the ultrasonic wave.

The processor 330 may detect an object based on reflected infrared light which emitted infrared light is reflected from the object, and track the object. The processor 330 may execute operations, such as a calculation of a distance from the object, a calculation of a relative speed with the object and the like, based on the infrared light.

According to an embodiment, the object detecting apparatus 320 may include a plurality of processors 330 or may not include any processor 330. For example, each of the camera 321, the radar 322, the LiDAR 323, the ultrasonic sensor 324 and the infrared sensor 325 may include the processor in an individual manner.

When the processor 330 is not included in the object detecting apparatus 320, the object detecting apparatus 320 may operate according to the control of a processor of an apparatus within the vehicle 300 or the controller 370.

The navigation system 350 may provide location information related to the vehicle based on information obtained through the communication apparatus 400, in particular, a location information unit 420. Also, the navigation system 350 may provide a path (or route) guidance service to a destination based on current location information related to the vehicle. In addition, the navigation system 350 may provide guidance information related to surroundings of the vehicle based on information obtained through the object detecting apparatus 320 and/or a V2X communication unit 430. In some examples, guidance information, autonomous driving service, etc. may be provided based on V2V, V2I, and V2X information obtained through a wireless communication unit operating together with the antenna system 1000.

The object detecting apparatus 320 may operate according to the control of a controller 370.

The communication apparatus 400 may be an apparatus for performing communication with an external device. Here, the external device may be another vehicle, a mobile terminal, or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a 4G wireless communication module 450, and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideB and (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 300 and at least one external device.

The location information unit 420 may be a unit for acquiring location information related to the vehicle 300. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit implementing communication protocols such as V2I, V2V, and V2P.

The optical communication unit 440 may be a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 300.

The broadcast transceiver 450 may be a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The wireless communication unit 460 is a unit that performs wireless communications with one or more communication systems through one or more antenna systems. The wireless communication unit 460 may transmit and/or receive a signal to and/or from a device in a first communication system through a first antenna system. In addition, the wireless communication unit 460 may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

According to the present disclosure, the antenna system 1000 operating in the first and second communication systems may be disposed on the roof, in the roof or in the roof frame of the vehicle 300 according to one of FIGS. 2A to 2C. Meanwhile, the wireless communication unit 460 of FIG. 3 may operate in both the first and second communication systems, and may be combined with the antenna system 1000 to provide multiple communication services to the vehicle 300.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 300 or the controller 370.

Meanwhile, the communication apparatus 400 may implement a display apparatus for a vehicle together with the user interface apparatus 310. In this instance, the display apparatus for the vehicle may be referred to as a telematics apparatus or an Audio Video Navigation (AVN) apparatus.

The communication apparatus 400 may operate according to the control of the controller 370.

At least one processor and the controller 370 included in the vehicle 300 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 300 related to the present disclosure can operate in any one of a manual driving mode and an autonomous driving mode. That is, the driving modes of the vehicle 300 may include the manual driving mode and the autonomous driving mode.

Hereinafter, description will be given of implementations of a multi-transceiving system structure and an electronic device or vehicle having the same with reference to the accompanying drawings. Specifically, implementations related to a broadband antenna operating in a heterogeneous radio system, and an electronic device and a vehicle having the same will be described. It will be apparent to those skilled in the art that the present disclosure may be embodied in other specific forms without departing from the idea or essential characteristics thereof.

Figure 4:
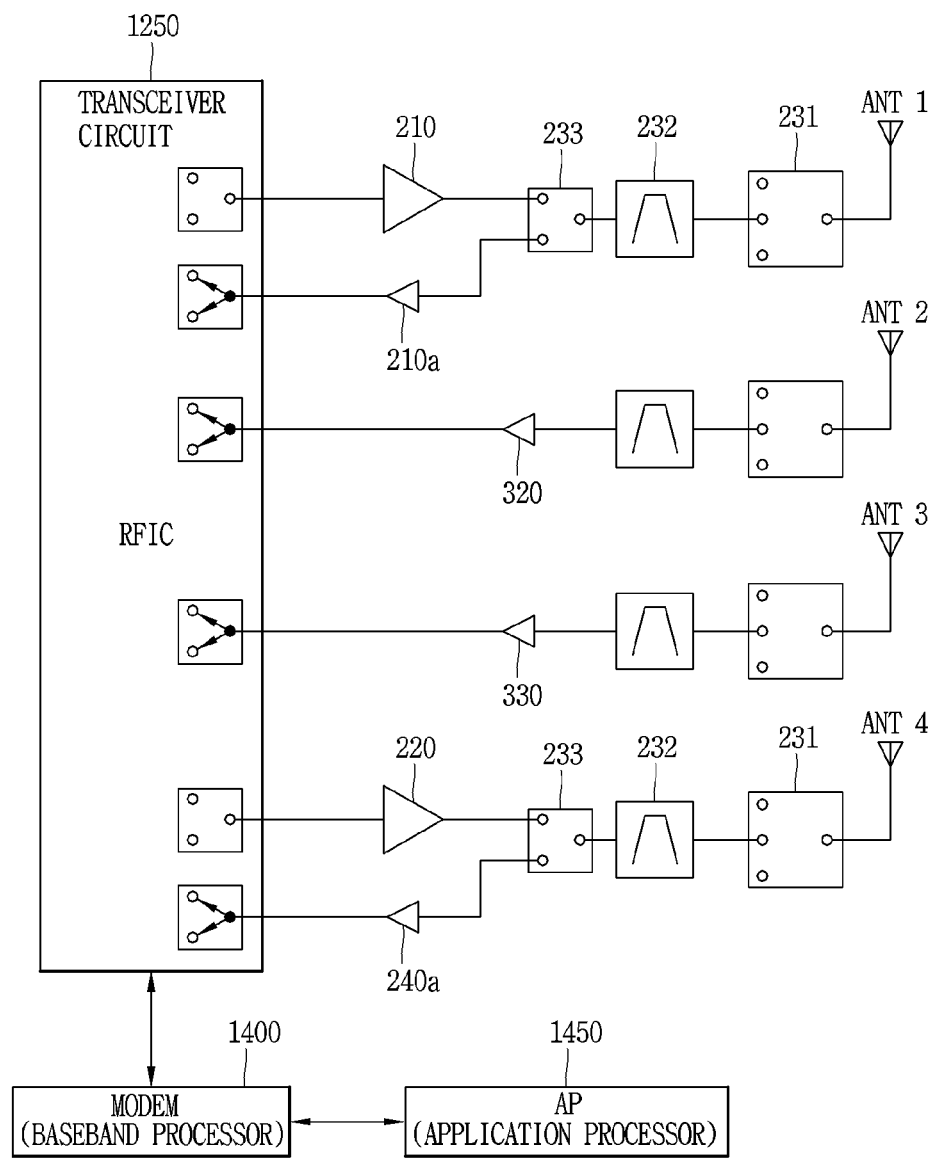
FIG. 4 is a block diagram illustrating a configuration of a wireless communication unit of an electronic device or vehicle operable in a plurality of wireless communication systems according to the present disclosure.

FIG. 4 is a block diagram illustrating a configuration of a wireless communication unit of an electronic device or vehicle operable in a plurality of wireless communication systems according to the present disclosure. Referring to FIG. 4, the electronic device or the vehicle may include a first power amplifier 210, a second power amplifier 220, and an RFIC 1250. In addition, the electronic device or the vehicle may further include a modem 1400 and an application processor (AP) 1450. Here, the modem 1400 and the application processor (AP) 1450 may be physically implemented on a single chip, and may be implemented in a logically and functionally separated form. However, the present disclosure may not be limited thereto and may be implemented in the form of a chip that is physically separated according to an application.

Meanwhile, the electronic device or the vehicle may include a plurality of low noise amplifiers (LNAs) 210a to 240a in the receiver. Here, the first power amplifier 210, the second power amplifier 220, the RFIC 1250, and the plurality of low noise amplifiers 210a to 40a may all be operable in the first communication system and the second communication system. In this case, the first communication system and the second communication system may be a 4G communication system and a 5G communication system, respectively.

As illustrated in FIG. 2, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and also there may be an advantage that control signaling by the modem 1400 can be simplified.

On the other hand, when the RFIC 1250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 1250 may be configured as a 4G/5G separated type. As such, when the RFIC 1250 is configured as the 4G/5G separate type, there may be an advantage that the RF characteristics can be optimized for each of the 4G band and the 5G band.

Meanwhile, even when the RFIC 1250 is configured as the 4G/5G separate type, the 4G RFIC and the 5G RFIC may be logically and functionally separated but physically implemented in one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when the electronic device is determined to be in an idle mode, the application processor (AP) 1450 may control the RFIC 1250 through the modem 400 as follows. For example, when the electronic device is in an idle mode, the application processor 1450 may control the RFIC 1250 through the modem 1400, such that at least one of the first and second power amplifiers 210 and 220 operates in a low power mode or is turned off.

According to another implementation, the application processor (AP) 1450 may control the modem 1400 to enable wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 1450 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 1400 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery capacity and the available radio resources are sufficient, the application processor (AP) 1450 may control the modem 1400 and the RFIC 1250 to receive data through both the 4G base station and 5G base station.

Meanwhile, in a multi-transceiving system of FIG. 4, a transmitter and a receiver of each radio system may be integrated into a single transceiver. Accordingly, a circuit portion for integrating two types of system signals may be removed from an RF front-end.

In addition, since the front-end component can be controlled by the integrated transceiver, the front-end component can be more efficiently integrated than a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems.

On the other hand, when the 5G communication system operates in a millimeter wave (mmWave) band, one of the first and second power amplifiers 210 and 220 may operate in either the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT2 to ANT4 may be configured to operate in both the 4G band and the 5G band. On the contrary, when the 5G band is the millimeter wave (mmWave) band, first to fourth antennas ANT2 to ANT4 may be configured to operate in either one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller.

In addition, the electronic device or the vehicle capable of operating in a plurality of wireless communication systems according to an implementation may further include a duplexer 231, a filter 232, and a switch 233.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, the signal in the reception band received through the antennas ANT1 and ANT4 may be received by the low noise amplifiers 310 and 340 through a second output port of the duplexer 231.

The filter 232 may be configured to pass a signal in a transmission band or a reception band and to block a signal in a remaining band. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. In this case, the transmission signal and the reception signal may be in the same frequency band, and thus the duplexer 231 may be implemented in a form of a circulator.

Meanwhile, in another implementation of the present disclosure, the switch 233 may also be applied to a frequency division multiplex (FDD) scheme. In this case, the switch 233 may be configured in the form of a double-pole double-throw (DPDT) to connect or block a transmission signal and a reception signal, respectively. On the other hand, since the transmission signal and the reception signal can be separated by the duplexer 231, the switch 233 may not be necessarily required.

Meanwhile, the electronic device or the vehicle according to the present disclosure may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 210 and 220 to transmit a 4G signal or a 5G signal in a specific time interval. In addition, the RFIC 1250 may control reception circuits including the first to fourth low noise amplifiers 310 to 340 to receive a 4G signal or a 5G signal in a specific time interval.

Figure 5A:
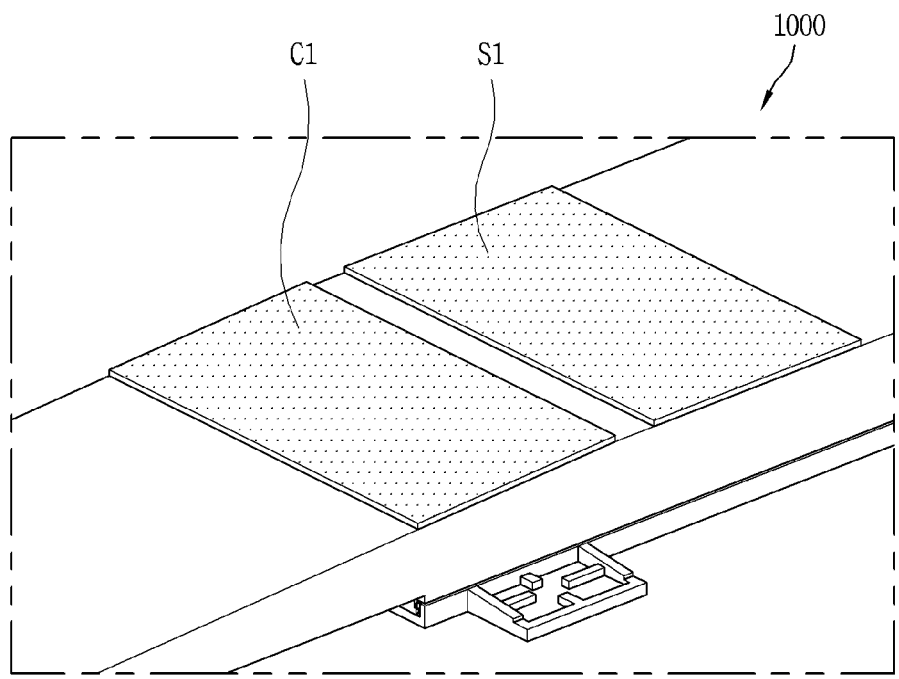
FIG. 5A is a conceptual view illustrating an antenna implemented by a plurality of metal frames disposed at the exterior of an antenna module according to the present disclosure.
Figure 5B:
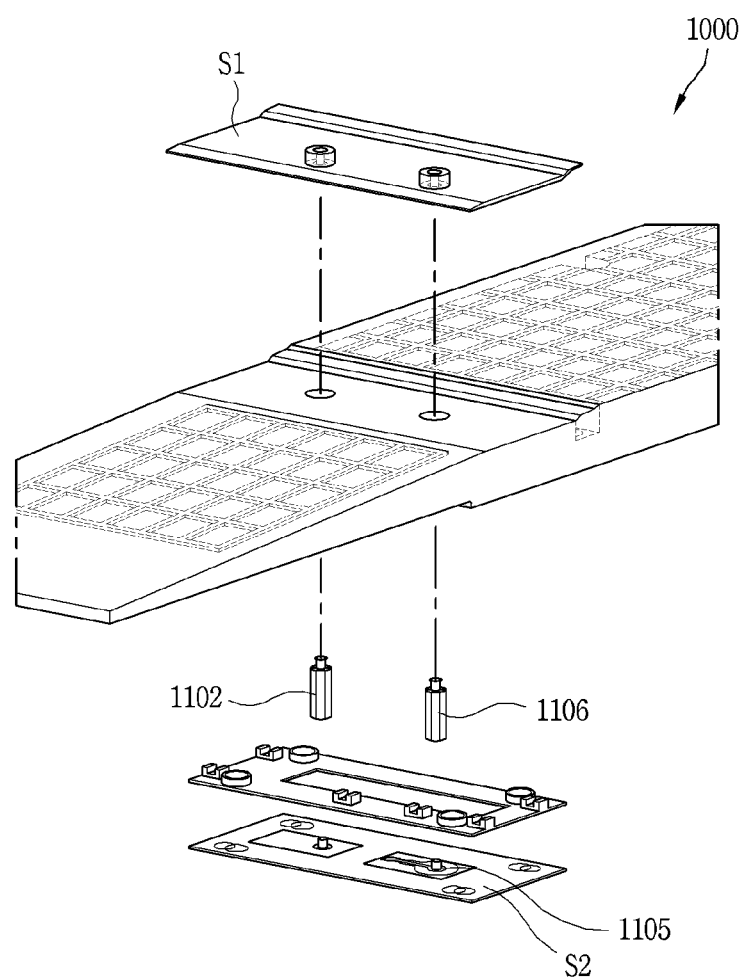
FIG. 5B is a view illustrating a detailed structure of the antenna implemented by the plurality of metal frames disposed at the exterior of the antenna module.

Hereinafter, a description will be given of an antenna module (i.e., antenna system) mounted in a vehicle according to FIGS. 2A to 4 and an antenna implementation method using a metal at the exterior of the module. In this regard, FIG. 5A is a conceptual view illustrating an antenna implemented by a plurality of metal frames disposed at the exterior of an antenna module according to the present disclosure. FIG. 5B is a view illustrating a detailed structure of the antenna implemented by the plurality of metal frames disposed at the exterior of the antenna module.

Figure 6A:
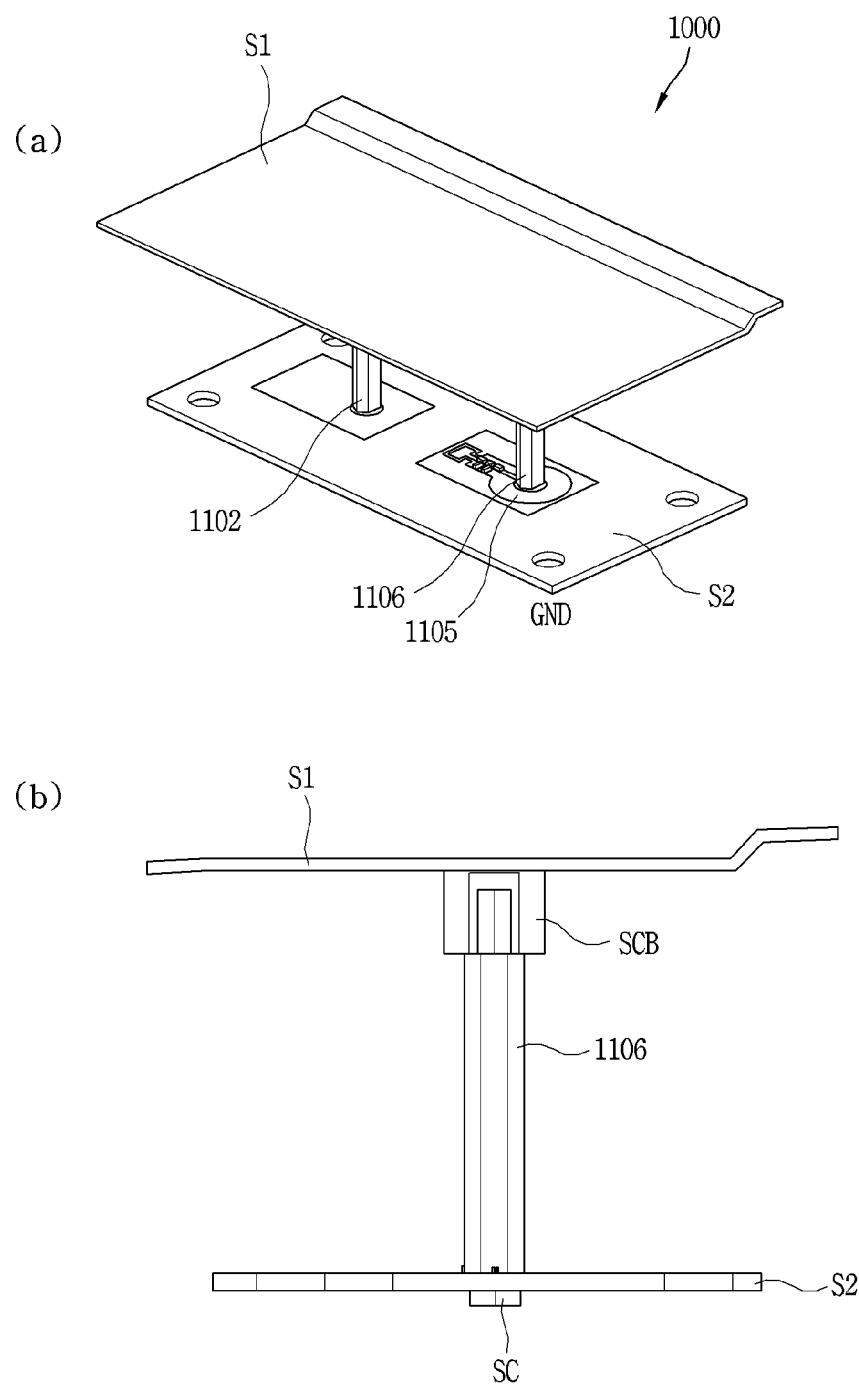
FIG. 6A is a conceptual view illustrating an antenna implemented by a metal frame disposed at the exterior of an antenna module according to the present disclosure.
Figure 6B:
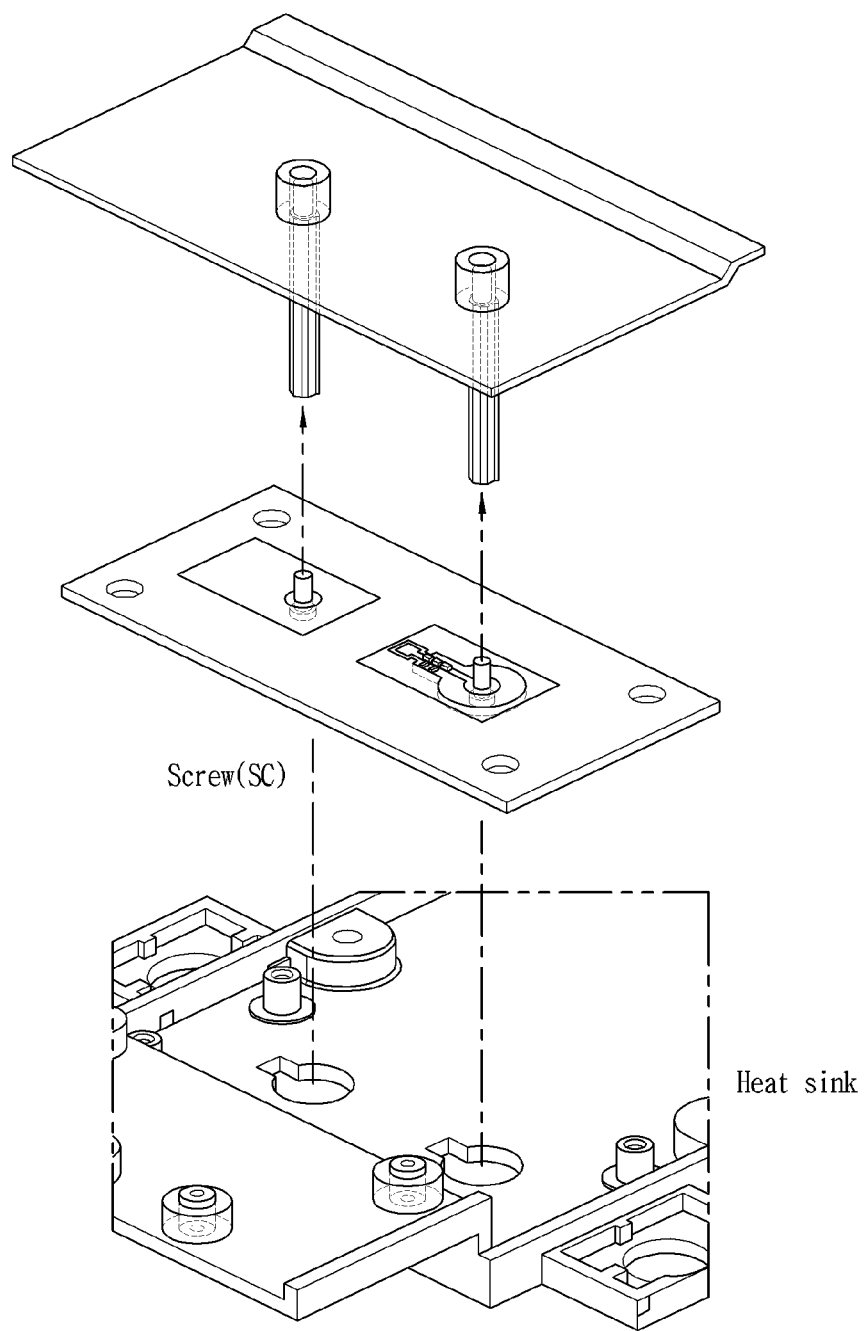
FIG. 6B is a view illustrating a detailed structure of the antenna implemented by the metal frame disposed at the exterior of the antenna module.

FIG. 6A is a conceptual view illustrating an antenna implemented by a metal frame disposed at the exterior of an antenna module according to the present disclosure. FIG. 6B is a view illustrating a detailed structure of the antenna implemented by the metal frame disposed at the exterior of the antenna module.

Figure 7A:
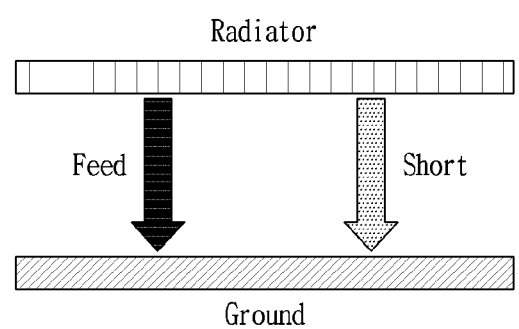
FIG. 7A is a conceptual view illustrating a broadband matching structure in an antenna including a radiator and a ground according to the present disclosure.
Figure 7A:
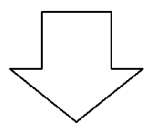
Figure 7A:
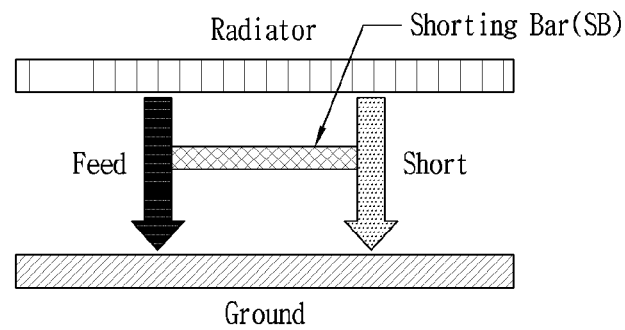
Figure 7B:
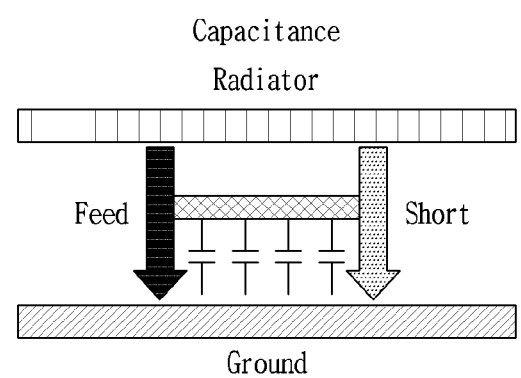
FIG. 7B is a view illustrating an equivalent circuit of the broadband matching structure.
Figure 7B:
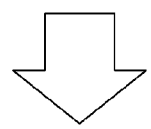
Figure 7B:
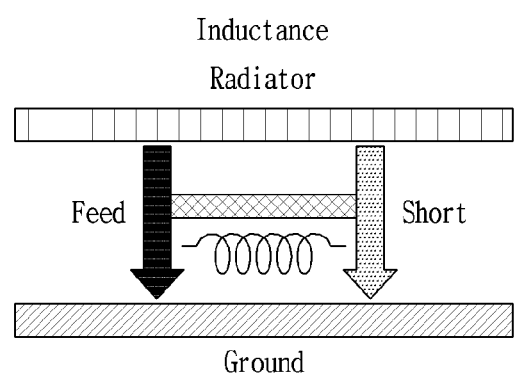

On the other hand, an antenna implemented by a metal frame according to the present disclosure can expand a bandwidth through a broadband matching structure. In this regard, FIG. 7A is a conceptual view illustrating a broadband matching structure in an antenna including a radiator and a ground according to the present disclosure. FIG. 7B is a view illustrating an equivalent circuit of the broadband matching structure.

Figure 8A:
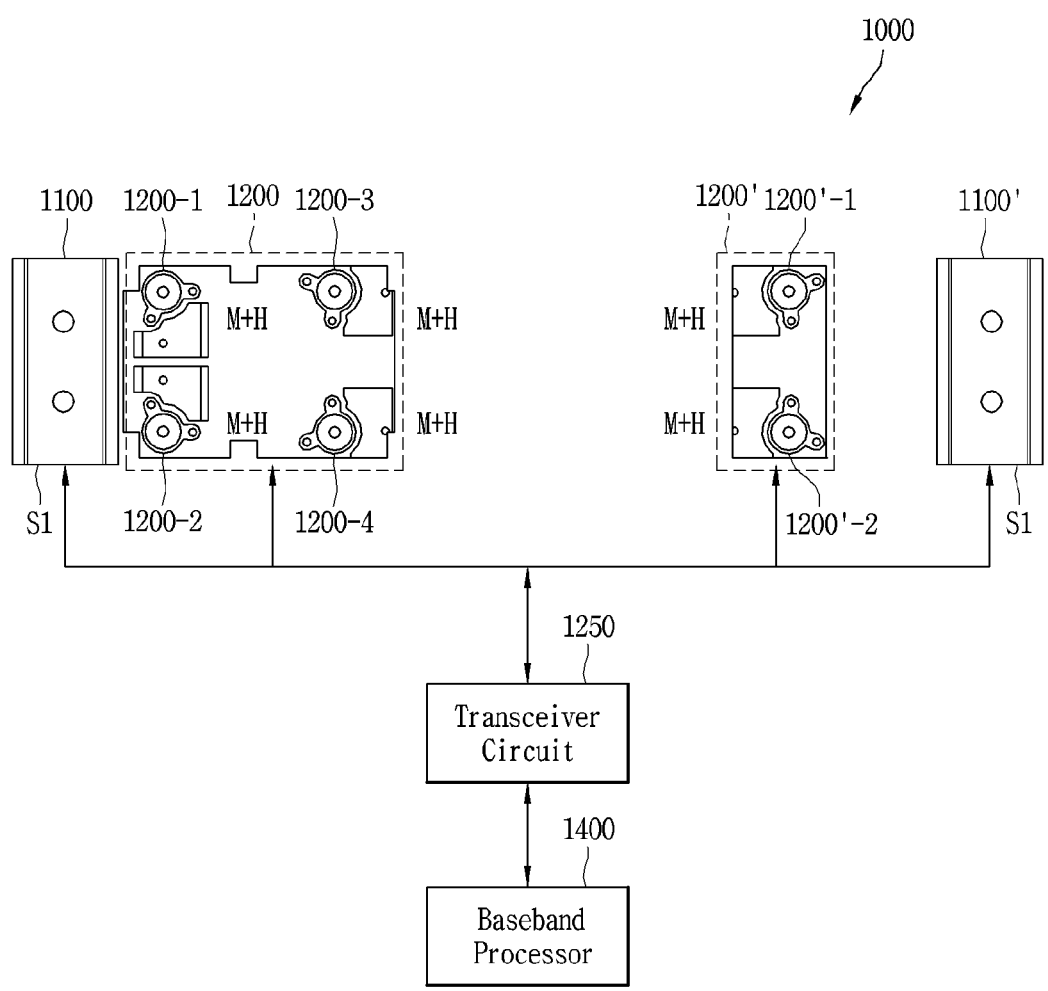
FIGS. 8A to 8C are views illustrating an antenna system including a plurality of antennas according to one implementation.
Figure 8B:
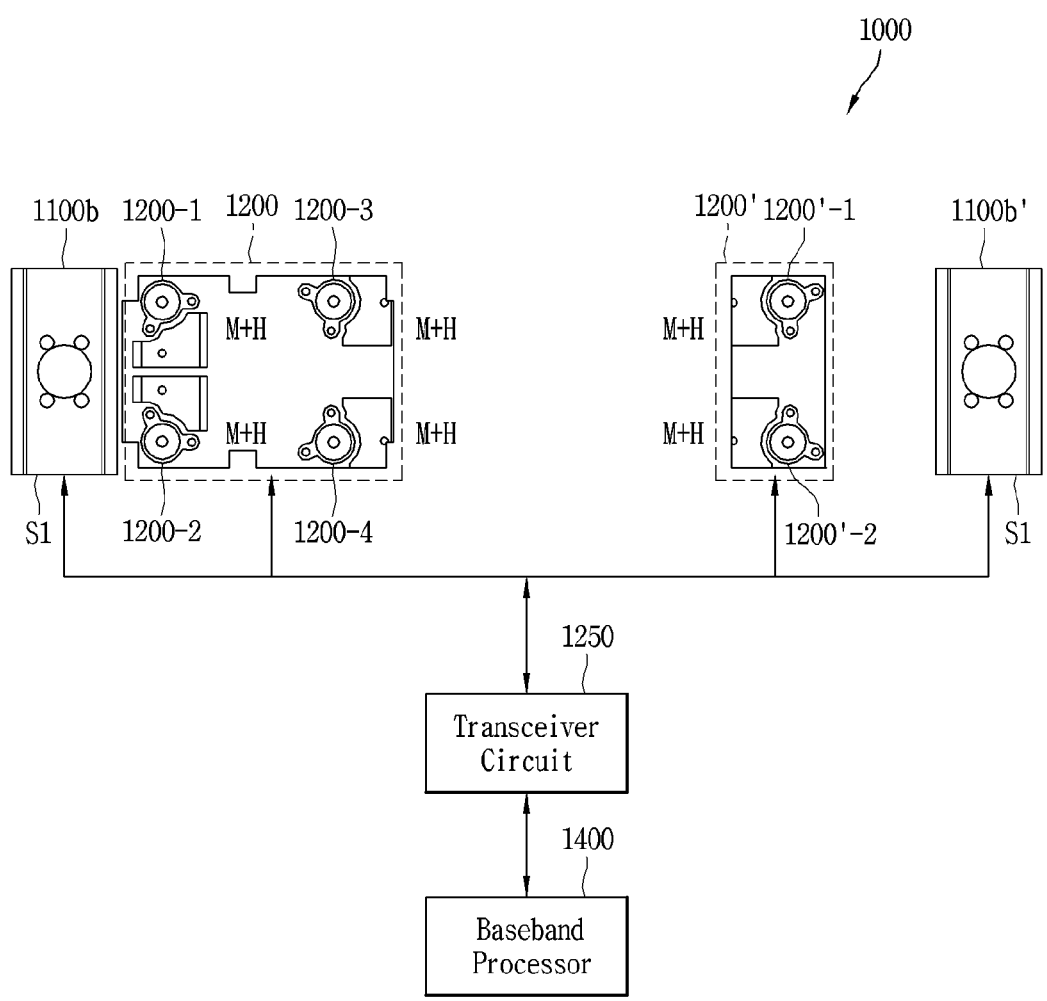
Figure 8C:
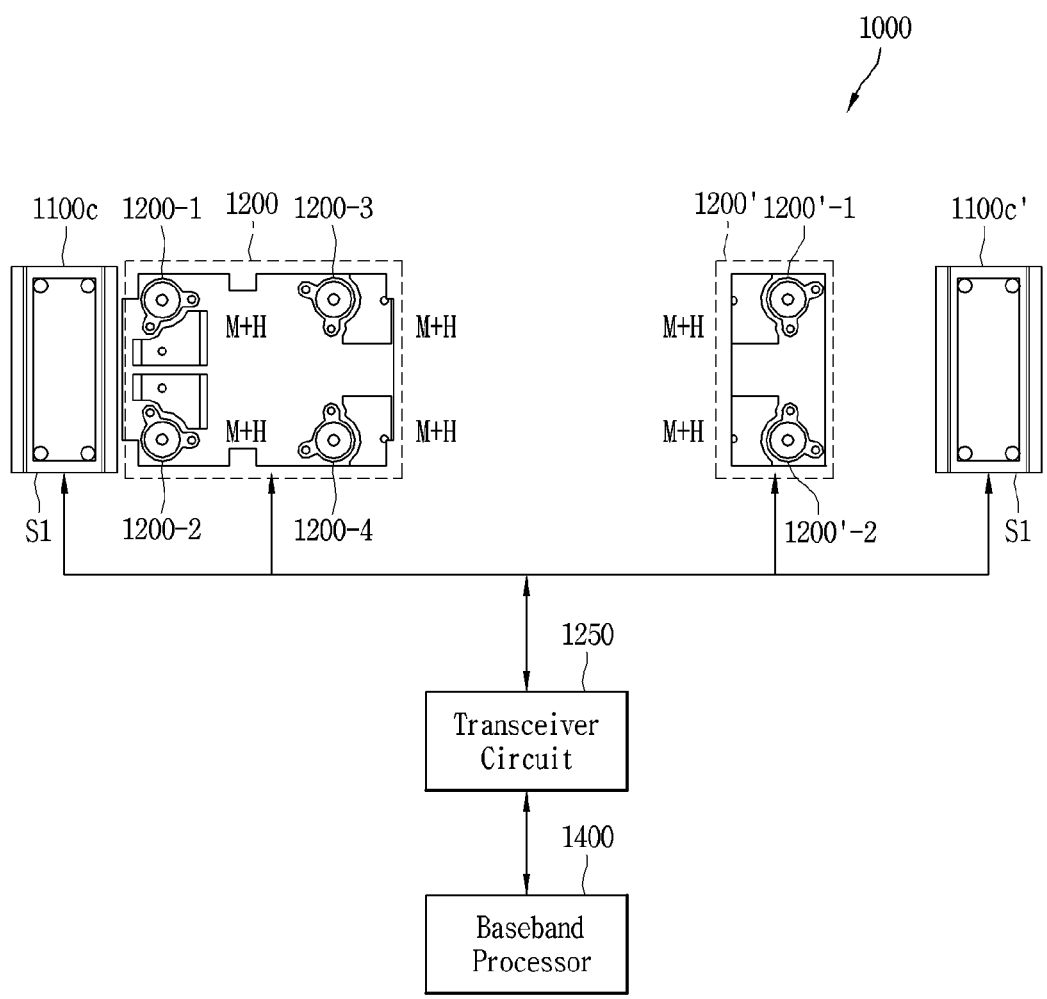

In this regard, the antenna module (i.e., antenna system) according to the present disclosure may include a plurality of antennas in addition to the aforementioned low band (LB) antenna. In this regard, FIGS. 8A to 8C are views illustrating an antenna system including a plurality of antennas according to one implementation.

Hereinafter, an implementation of an antenna using the exterior of the antenna module and the requirements for an antenna system mounted in a vehicle will be described.

Vehicle antenna requirements: Mean gain of −2 dBi at low elevation, i.e. 70 to 90 degrees of elevation.

Limitations of the related art: With an antenna technology using an inner space of a module, it is difficult to satisfy antenna performance requirements due to performance degradation caused by a low antenna height.

Necessity of the present disclosure: An antenna structure is required to improve antenna performance without an additional increase in height to secure antenna performance.

Referring to FIGS. 5A to 8C, the antenna system mounted in the vehicle may include a first antenna 1100 operating in a low band LB and a second antenna 1100 operating in a middle band MB and a high band HB. Here, the first antenna 1100 may operate in a band including 650 MHz to 900 MHz or 600 MHz to 960 MHz, which is the low band LB. However, the low band LB may not be limited thereto and may vary depending on applications. The second antenna 1200 may operate in the middle band MB starting from 1400 MHz and the high band HB which is a higher frequency band than the middle band MB.

The antenna system mounted in the vehicle may include a transceiver circuit 1250 for controlling a signal to be radiated through at least one of the first antenna 1100 and the second antenna 1200. In addition, the antenna system mounted in the vehicle may further include a baseband processor 1400 configured to perform communication with at least one of an adjacent vehicle, a Road Side Unit (RSU), and a base station through the transceiver circuit The first antenna 1100 operating in the first frequency band, which is the low band LB, may include a metal plate S1, a lower substrate S2, a shorting pin 1102, a feeder 1105, and a metal supporter 1106.

In this regard, the metal plate S1 may define a part of the exterior of the antenna system and may act as a radiator. The metal plate S1 may be formed such that a height of a central portion is lower than a height of a side portion. Since the height of the central portion of the metal plate S1 is low, the shorting pin 1102 and the metal supporter 1106 may be low in height. Accordingly, an amount of signals which are radiated directly through the shorting pin 1102 and the metal supporter 1106 can be reduced, namely, a feeding loss can be reduced, thereby improving antenna efficiency.

In addition, when a signal is mainly radiated through the side portion of the metal plate S1, an effective height of the entire antenna may be mainly determined by the height of the side portion rather than the central portion of the metal plate S1. With the structure that the height of the side portion is made higher than the height of the central portion of the metal plate S1, the effective height of the entire antenna can be increased and thus antenna performance can be improved.

The lower substrate S2 may be disposed under the metal plate S1 and the feeder 1105 may be disposed on a front surface of the lower substrate S2. The feeder 1105 may be disposed on the front surface of the lower substrate to transfer a signal to the metal plate S1 through the metal supporter 1106. In this regard, the feeder 1105 formed in a ring shape may be connected to the transceiver circuit 1250, and may include a matching circuit for impedance matching between the feeder 1105 and the transceiver circuit 1250.

The shorting pin 1102 may connect the ground of the lower substrate S2 and the metal plate S1. To this end, the metal plate S1 may include a screw boss SCB configured to fasten the shorting pin 1102 and the metal plate S1. In addition, the shorting pin 1102 and the lower substrate S2 may be fixed by a screw SC fastened to a rear surface of the lower substrate S2.

The metal supporter 1106 may also connect the ground of the lower substrate S2 and the metal plate S1. To this end, the metal plate S1 may include a screw boss SCB configured to fasten the metal supporter 1106 and the metal plate S1. In addition, the metal supporter 1106 and the lower substrate S2 may be fixed by a screw SC fastened to the rear surface of the lower substrate S2.

On the other hand, since the antenna system is mounted to a roof or roof frame of the vehicle, heat generation may occur greatly depending on an external environment, the operation of the vehicle, and the operation of the antenna system. To solve this problem, the lower substrate S2 may be coupled to a vehicle frame through a heat sink, instead of being directly coupled to the vehicle frame. Accordingly, the lower substrate S2 may include a screw fastening hole and a heat sink fastening hole.

On the other hand, the first antenna 1100 may further include a second metal plate C2 for bandwidth extension. Here, the second metal plate C2 may be disposed adjacent to the metal plate S1 for coupling of a signal from the metal plate S1, and allow the first antenna 1100 to operate in a broad band. Accordingly, the first antenna 1100 can operate in a first frequency band that is the low band LB and a second frequency band that is higher than the first frequency band. This can allow the first antenna 1100 to operate in a band including 600 MHz to 3.8 GHz.

Figure 9A:
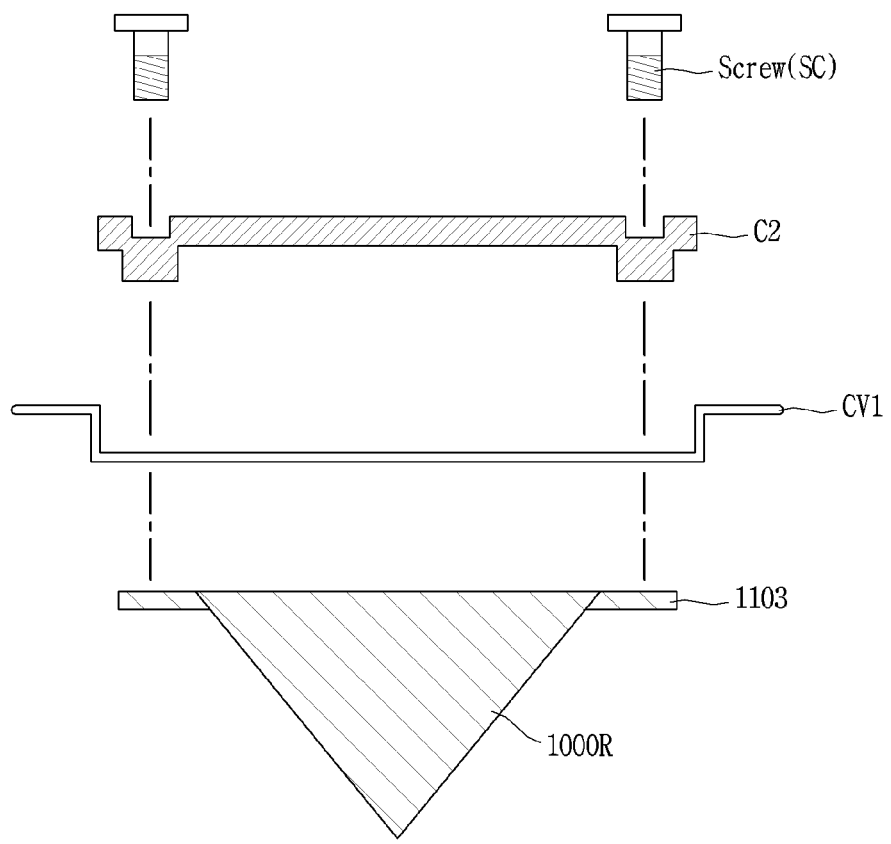
FIGS. 9A to 9C are views illustrating a structure in which a cone radiator is coupled to a metal plate in accordance with various implementations.
Figure 9B:
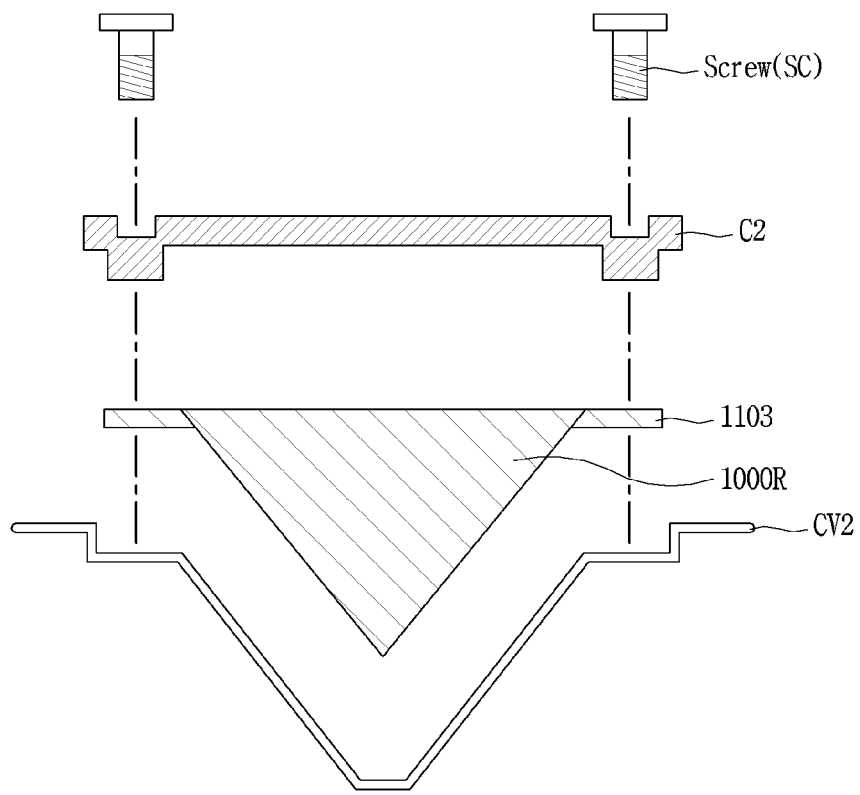
Figure 9C:
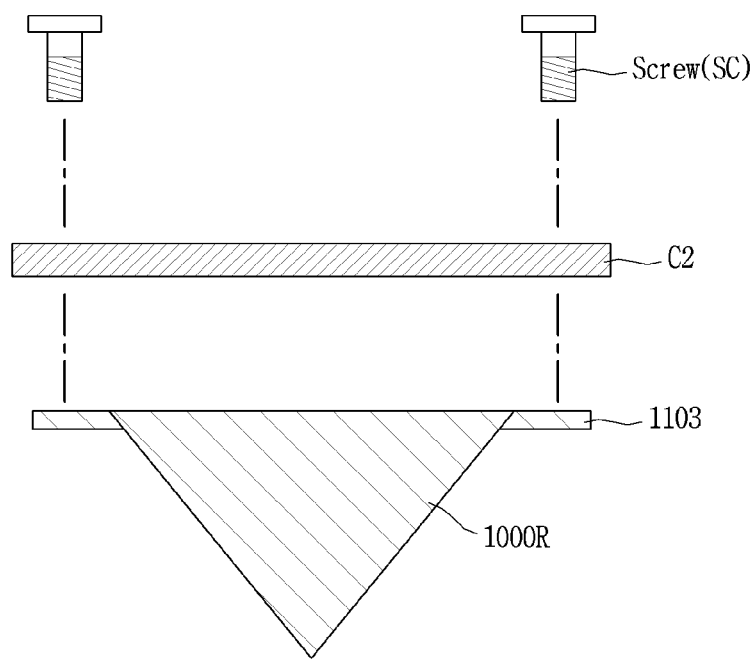

To this end, the first antenna 1100 may be connected to a cone radiator. FIGS. 9A to 9C are views illustrating a structure in which a cone radiator is coupled to a metal plate in accordance with various implementations. Referring to FIGS. 9A to 9C, a cover CV1 may be disposed between the cone radiator 1000R and the second metal plate C2 or the height of the second metal plate C2 itself may increase to increase the antenna height. As the height of the entire antenna structure increases as described above, antenna performance can be improved.

In relation to this, a second feeder may be disposed at a lower aperture of the cone radiator 1000R coupled to the second metal plate C2. Accordingly, the first antenna 1100 can operate as a low band (LB) antenna by receiving a first signal of the first frequency band through the feeder 1105. In addition, the first antenna 1100 can operate as a middle band (MB) antenna and a high band (HB) antenna by receiving a second signal of the second frequency band through the second feeder.

Accordingly, the first antenna 1100 can be implemented to operate in any band by selectively applying a signal to the feeder 1105 or the second feeder of the first antenna 1100. Alternatively, even when a signal is applied only through the feeder 1105, the first antenna 1100 can be implemented to operate in any band through the metal plate S1 and the second metal plate C2. As another alternative, even when a signal is applied only through the second feeder, the first antenna 1100 can be implemented to operate in any band through the metal plate S1 and the second metal plate C2.

Figure 14A:
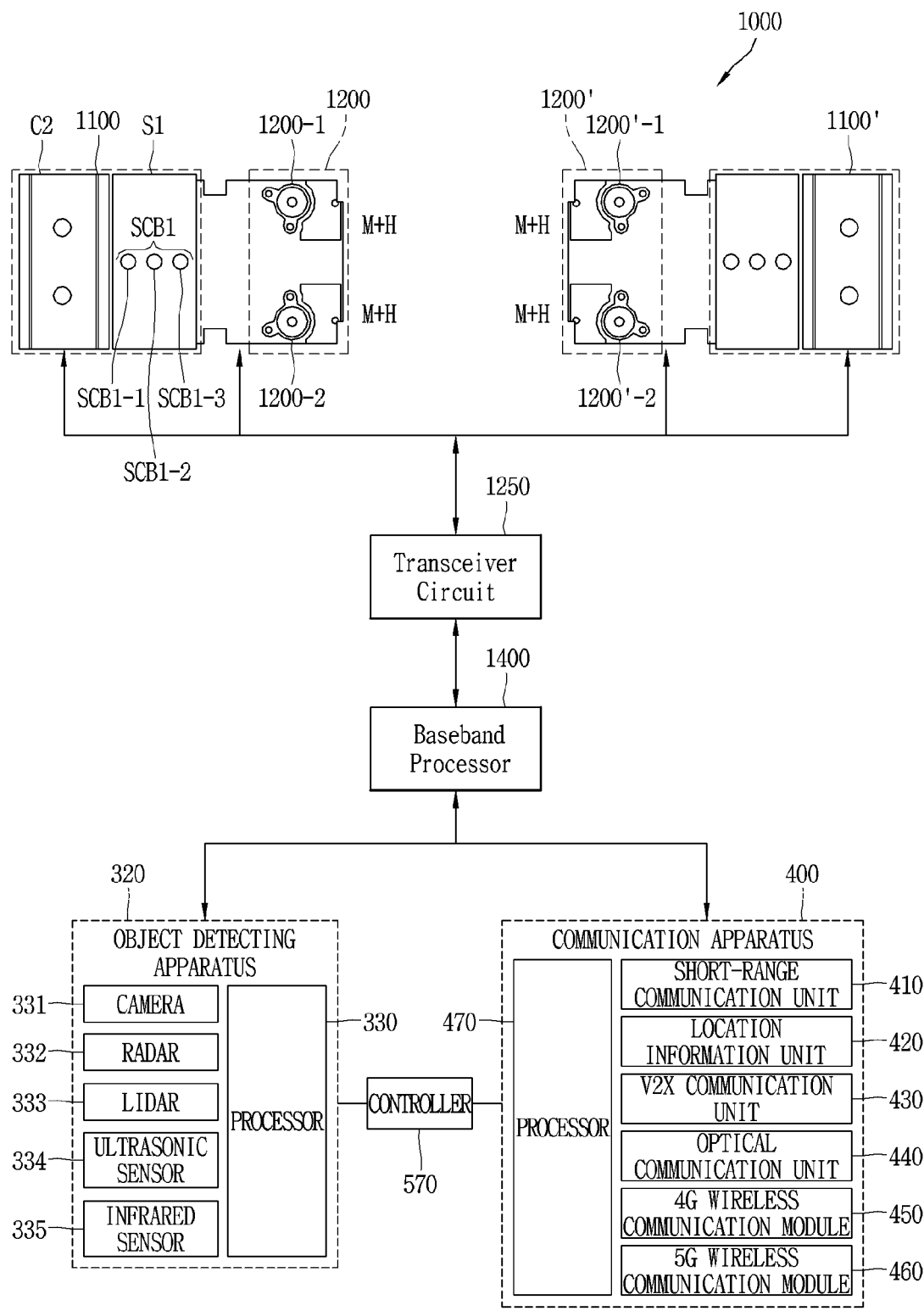
FIGS. 14A to 14C are block diagrams illustrating a broadband antenna system and a vehicle in which the antenna system is mounted according to the present disclosure.
Figure 14B:
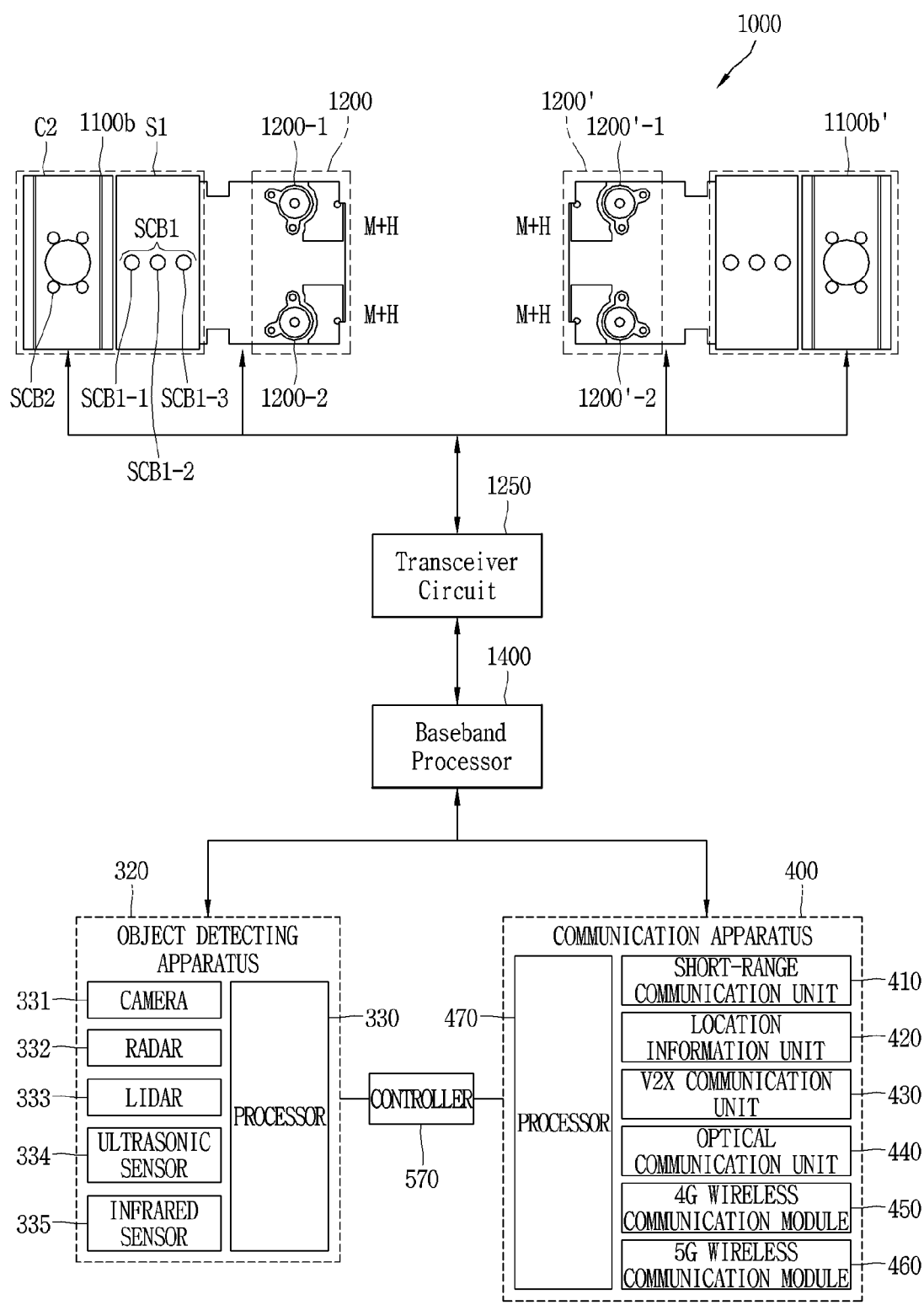
Figure 14C:
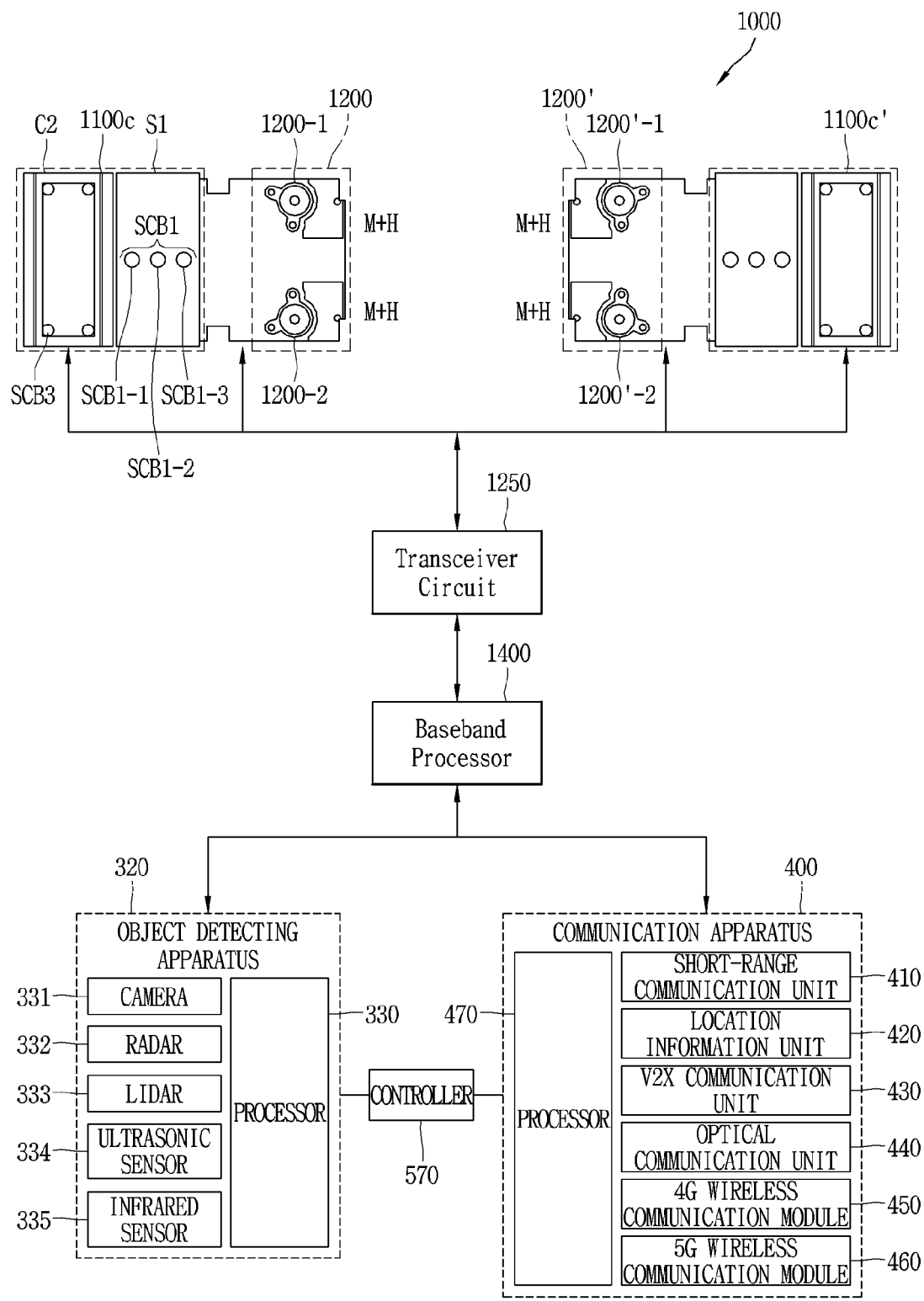

FIGS. 8A to 8C illustrate the antenna system 1000 that includes the first antennas 1100 and 1100' operating in the low band LB and the second antennas 1200 and 1200' operating in the middle band MB and the high band HB. Here, the first antennas 1100 and 1100' may include the single metal plate S1 to operate in the low band LB. On the other hand, FIGS. 14A to 14C illustrate the antenna system 1000 that includes the first antennas 1100 and 1100' operating in all of the bands and the second antennas 1200 and 1200' operating in the middle band MB and the high band HB. To this end, the first antennas 1100 and 1100' may include the second metal plate C2 disposed adjacent to the metal plate S1 to be coupled to the metal plate S1. For a detailed description thereof, the configuration illustrated in FIGS. 14A to 14C will be understood by the previous description of the second metal plate C2.

FIG. 8A illustrates the antenna system 1000 that includes patch-type metal plates S1. Referring to FIG. 8A, the patch-type metal plates S1 disposed on the left and right sides of the antenna system 1000 may configure the first antennas 1100 and 1100'.

The second antennas 1200 and 1200' may be disposed adjacent to the first antennas 1100 and 1100'. As an example, the second antenna 1200 may include four cone antennas 1200-1 to 1200-4. In addition, the second antenna 1200' may include two cone antennas 1200'-1 to 1200'-2 spaced apart from the four cone antennas 1200-1 to 1200-4 by a predetermined distance. However, the present disclosure may not be limited thereto and may vary depending on applications. The first antennas 1100 and 1100' may be denoted by L and the second antennas 1200 and 1200' may be denoted by M+H. The second antennas 1200 and 1200' may include the cone antennas that are rotated by predetermined angles. Meanwhile, an upper aperture of each cone antenna may be implemented in a multi-wing structure corresponding to outer rims for fastening with the upper substrate and for a broadband operation. As illustrated, a wing angle of each cone antenna may be substantially about 120 degrees.

Accordingly, when two wing structures are provided for each cone antenna at an interval of about 120 degrees, structural stability of the cone antenna can be achieved and the position of the shorting pin can be variably implemented. In addition, a metal patch disposed adjacent to the cone antenna may be implemented in two structures according to the shape of the wing. That is, a metal patch of a first structure may have a portion removed in a circular shape to be arranged along two wings with an interval of 120 degrees, and the shorting pin may be connected at a position offset from a center. On the other hand, a metal patch of a second structure may have a portion removed in a circular shape to be arranged along two wings with an interval of 240 degrees, and the shorting pin may be located at a center.

Meanwhile, the antenna system may further include a transceiver circuit 1250 configured to apply a signal to at least one of the first antennas 1100 and 1100' and the second antennas 1200 and 1200'. In addition, the baseband processor 1400 may apply a signal to at least one of the first antennas 1100 and 1100' and the second antennas 1200 and 1200', so as to control the transceiver circuit 1250 to perform MIMO, diversity and/or CA in the first frequency band and/or the second frequency band. When performing the MIMO operation, the baseband processor 1400 may use one of the second antennas 1200 and one of the second antennas 1200' in the second frequency band, which is the low band LB, in order to reduce an interference level. In particular, the interference due to a distance between elements and different shapes can be reduced by using an element disposed at an upper side of the second antennas 1200 and an element disposed at a lower side of the second antennas 1200'.

Meanwhile, FIG. 8B illustrates the antenna system 1000 that uses the metal plate S1 coupled to a circular cone. Referring to FIG. 8B, the metal plates S1 disposed on the left and right sides of the antenna system 1000 may configure first antennas 1100*b* and 1100*b*'. Here, the circular cone antenna may mean that an upper aperture is circular, but it is not necessarily limited to the circular shape and may be expandable to include any polygonal structure.

The second antennas 1200 and 1200' may be disposed adjacent to the first antennas 1100*b* and 1100*b*'. As an example, the second antenna 1200 may include four cone antennas 1200-1 to 1200-4. In addition, the second antenna 1200' may include two cone antennas 1200'-1 to 1200'-2 spaced apart from the four cone antennas 1200-1 to 1200-4 by a predetermined distance. However, the present disclosure may not be limited thereto and may vary depending on applications. The first antennas 1100*b* and 1100*b*' may be denoted by L and the second antennas 1200 and 1200' may be denoted by M+H. The second antennas 1200 and 1200' may include the cone antennas that are rotated by predetermined angles. Meanwhile, an upper aperture of each cone antenna may be implemented in a multi-wing structure corresponding to outer rims for fastening with the upper substrate and for a broadband operation. As illustrated, a wing angle of each cone antenna may be substantially about 120 degrees.

Meanwhile, the antenna system may further include the transceiver circuit 1250 configured to apply a signal to at least one of the first antennas 1100*b* and 1100*b*' and the second antennas 1200 and 1200'. In addition, the baseband processor 1400 may apply a signal to at least one of the first antennas 1100*b* and 1100*b*' and the second antennas 1200 and 1200', so as to control the transceiver circuit 1250 to perform MIMO, diversity and/or CA in the first frequency band and/or the second frequency band. When performing the MIMO operation, the baseband processor 1400 may use one of the second antennas 1200 and one of the second antennas 1200' in the second frequency band, which is the low band LB, in order to reduce an interference level. In particular, the interference due to a distance between elements and different shapes can be reduced by using an element disposed at an upper side of the second antennas 1200 and an element disposed at a lower side of the second antennas 1200'.

Meanwhile, FIG. 8C illustrates the antenna system 1000 that uses the metal plate S1 coupled to a rectangular cone. Referring to FIG. 8C, the metal plates S1 disposed on the left and right sides of the antenna system 1000 may configure first antennas 1100*c* and 1100*c*'. Here, the rectangular cone antenna may mean that an upper aperture is rectangular, but it is not necessarily limited to the rectangular shape and may be expandable to include any polygonal structure. Since both upper and lower apertures have a rectangular shape and the lower aperture is smaller than the upper aperture, it may be referred to as an inverted pyramid structure.

The second antennas 1200 and 1200' may be disposed adjacent to the first antennas 1100*c* and 1100*c*'. As an example, the second antenna 1200 may include four cone antennas 1200-1 to 1200-4. In addition, the second antenna 1200' may include two cone antennas 1200'-1 to 1200'-2 spaced apart from the four cone antennas 1200-1 to 1200-4 by a predetermined distance. However, the present disclosure may not be limited thereto and may vary depending on applications. The first antennas 1100*c* and 1100*c*' may be denoted by L and the second antennas 1200 and 1200' may be denoted by M+H. The second antennas 1200 and 1200' may include the cone antennas that are rotated by predetermined angles. Meanwhile, an upper aperture of each cone antenna may be implemented in a multi-wing structure corresponding to outer rims for fastening with the upper substrate and for a broadband operation. As illustrated, a wing angle of each cone antenna may be substantially about 120 degrees.

Meanwhile, the antenna system may further include the transceiver circuit 1250 configured to apply a signal to at least one of the first antennas 1100*c* and 1100*c*' and the second antennas 1200 and 1200'. In addition, the baseband processor 1400 may apply a signal to at least one of the first antennas 1100*c* and 1100*c*' and the second antennas 1200 and 1200', so as to control the transceiver circuit 1250 to perform MIMO, diversity and/or CA in the first frequency band and/or the second frequency band. When performing the MIMO operation, the baseband processor 1400 may use one of the second antennas 1200 and one of the second antennas 1200' in the second frequency band, which is the low band LB, in order to reduce an interference level. In particular, the interference due to a distance between elements and different shapes can be reduced by using an element disposed at an upper side of the second antennas 1200 and an element disposed at a lower side of the second antennas 1200'.

Meanwhile, referring to FIG. 9A, a first cover CV1 may be included to be disposed between the second metal plate C2 and the cone radiator 1000R. In this regard, as the second metal plate C2 and the cone radiator 1000R are separated from each other, the height of the first antenna 1100 may increase, which can improve the performance of the first antenna 1100.

Referring to FIG. 9B, a second cover CV2 may be included to enclose the cone radiator 1000R under the cone radiator 1000R. In this regard, one of the first cover CV1 or the second cover CV2 may be disposed as illustrated in FIG. 9A or FIG. 9B. Alternatively, the second metal plate C2 and the cone radiator 1000R of the antenna system may include both the first cover CV1 of FIG. 9A and the second cover CV2 of FIG. 9B. Accordingly, the first cover CV1 can be disposed between the cone radiator 1000R and the second metal plate C2 to improve antenna performance, and the second cover CV2 can enclose the cone radiator 1000R to improve mechanical stability.

As described above, referring to FIGS. 9A and 9B, the height of the antenna can be increased by the first cover CV1 and/or the second cover CV2 made by injection-molding. Therefore, the antenna height can be substantially increased by the injection-molded first cover CV1 and/or second cover CV2, thereby improving antenna gain and efficiency.

Referring to FIGS. 5A and 9C, the height of the antenna can also be increased by a metal cover on the exterior of the antenna module, even without the injection-molded first cover CV1 and/or second cover CV2.

In this regard, referring to FIG. 9C, any cover may not be disposed between the second metal plate C2 and the cone radiator 1100R but the second metal plate C2 which is made thick may be disposed. As such, the entire height of the antenna structure can be increased by the thick second metal plate C2, and this can improve antenna performance.

On the other hand, referring to FIG. 9A, the second metal plate C2, the first cover CV1, and the outer rims 1103 integrally formed with the cone radiator 1000R may be connected together by screws SC that are coupled from the upper portion of the second metal plate C2.

Referring to FIG. 9B, the second metal plate C2, the outer rims 1103 integrally formed with the cone radiator 1000R, and the second cover CV2 may be connected together by screws SC coupled from the upper portion of the second metal plate C2.

Referring to FIG. 9C, the second metal plate C2 and the outer rims 1103 integrally formed with the cone radiator 1000R may be connected to each other by screws SC coupled from the upper portion of the second metal plate C2. In this case, the upper aperture of the cone radiator 1000R may be covered by the second metal plate C2 without a dielectric. That is, the upper aperture of the cone radiator 1000R may be covered by the second metal plate C2 without a cover made of a dielectric.

Meanwhile, referring to FIGS. 5A and 9A to 9C, a radiation patch and a cone radiator may be attached by a metal frame S1, and a double-injection structure may be applied to the second metal frame having a coupling structure with the metal frame S1. In this regard, lower substrates connected to the metal frame S1 and the second metal frame C2 may be molded on bonding portions by die-spotting. Accordingly, when the antenna system is mounted in a vehicle, it can obtain an excellent waterproof effect from humidity of an external environment and raining.

As described above, an antenna implemented by a metal frame according to the present disclosure can expand a bandwidth through a broadband matching structure. In this regard, FIG. 7A is a conceptual view illustrating a broadband matching structure in an antenna including a radiator and a ground according to the present disclosure. FIG. 7B is a view illustrating an equivalent circuit of the broadband matching structure.

Figure 10:
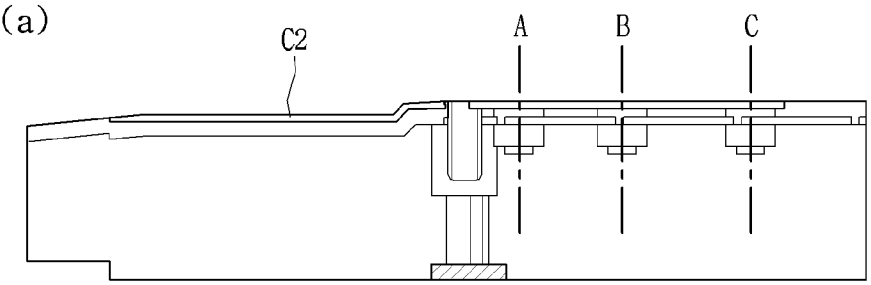
FIG. 10 is a view illustrating a configuration in which a shorting bar for implementing a broadband matching structure is assembled with a metal frame.
Figure 10:
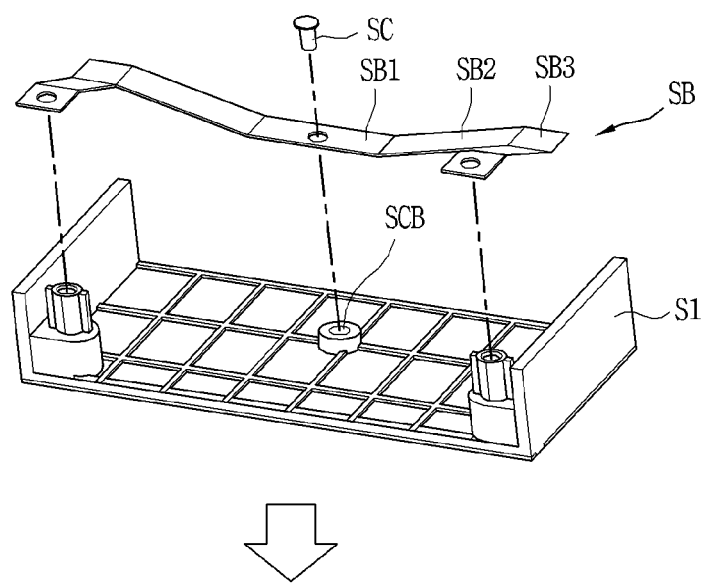
Figure 10:
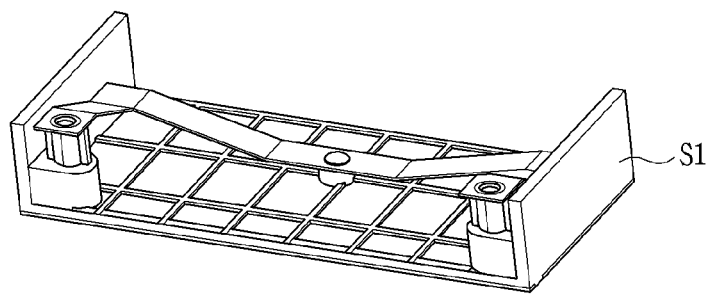
Figure 11:
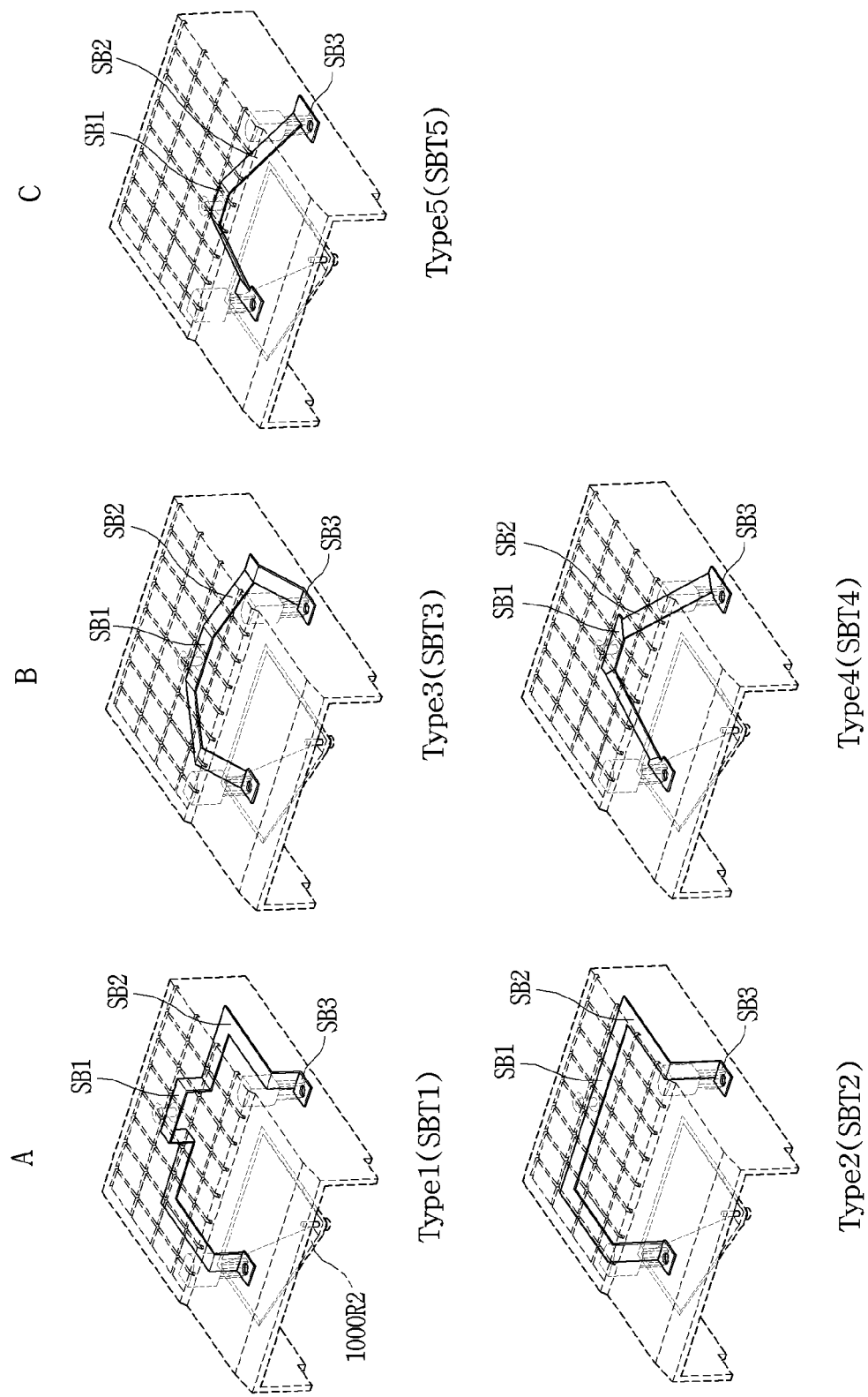
FIG. 11 is a view illustrating a configuration in which a broadband matching structure is connected to a shorting pin and a feeder in accordance with various implementations.

FIG. 10 is a view illustrating a configuration in which a shorting bar for implementing a broadband matching structure is assembled with a metal frame. FIG. 11 is a view illustrating a configuration in which a broadband matching structure is connected to a shorting pin and a feeder in accordance with various implementations.

Referring to FIG. 7A, the first antenna 1100 may include a feeder 1105 and a shorting pin 1102 connected between a radiator S1 and a ground of a lower substrate S2. On the other hand, the first antenna 1100 may include a shorting bar SB that is a broadband matching structure configured to connect the feeder (Feed) 1105 and the shorting pin (Short) 1102 in order to improve bandwidth characteristics.

Hereinafter, an operation principle of the shorting bar SB as the broadband matching structure configured to connect the feeder 1105 and the shorting pin 1102 will be described with reference to FIG. 7B. Referring to FIG. 7B, a space between the shorting bar SB and the ground may be modeled as an equivalent circuit having a different capacitance value for each frequency.

In addition, the shorting bar SB, which is the broadband matching structure configured to connect the feeder (Feed) 1105 and the shorting pin (Short) 1102, may be modeled as an equivalent circuit having a different inductance value for each frequency. When the shorting bars SB are formed in different shapes in units of predetermined regions, the shorting bars SB may be modeled as a structure in which different LC equivalent circuits are connected to each other. Therefore, the first antenna 1100 can operate in a broad band through the shorting bar SB for implementing the broadband matching structure.

In this regard, the requirements of the antenna system mounted in the vehicle and the necessity of the broadband matching structure as illustrated in the present disclosure will be described as follows.

Vehicle antenna requirements: Frequency coverage required from 600 MHz to 3.8 GHz Limitations of the related art: In order to satisfy a frequency coverage of 600 MHz to 960 MHz as an ODM requirement, a matching circuit and a matching device value that are difficult to be applied in practice are required. Due to the difficulty of implementing such a matching circuit, a mismatch loss occurs in a VSWR of 5:1, and improvement of the mismatch loss is required.

Necessity of the present disclosure: A low elevation gain characteristic required by ODM is −2 dBi in the range of 70 to 90 degrees based on the elevation. On the other hand, it is necessary to improve performance by about 3 dB at 600 MHz in a VSWR of 5:1, that is, a return loss of −5 dB. Therefore, the present disclosure may require a structure capable of improving broadband antenna matching characteristics in the frequency coverage of 600 MHz to 960 MHz.

Therefore, a matching technique using a structure by a shorting bar may be used for overcoming the limitation of impedance matching. Specifically, a matching range tuning effect can be obtained according to heights of shorting bars having various shapes.

Referring to FIG. 10, the shorting bar SB may be connected to the metal supporter 1106 of the feeder 1105 and the shorting pin 1102 and may be connected to one point in the metal plate S1. The shorting bar SB may be connected to a screw boss SCB formed at the one point in the metal plate S1.

Specifically, the shorting bar SB may include a connection part SB1 connected to the one point in the metal plate S1 and extension parts SB2 formed by being bent from the connection part SB1 at predetermined angles. The shorting bar SB may further include fastening parts SB3 formed at ends of the extension parts SB2 and fastened to the shorting pin 1102 and the metal supporter 1106.

Referring to FIG. 11, the shorting bar SB, which is the broadband matching structure, may be implemented as Type 1 to Type 5 structures. In this regard, in the antenna system, the first antenna 1100 can be implemented as a patch antenna and also be implemented as a broadband antenna through the shorting bar SB as the broadband matching structure.

Specifically, a resonant frequency of 600 MHz band may change according to a shorting position in the metal plate S1 operating as a patch antenna and a length of a bending structure. In this regard, it may be necessary to change the bending structure of the shorting bar SB, and to apply various tuning points in various bending structures. The shorting position may be 3 points or more, and the bending structure may be needed to change for performance optimization. Here, the shorting position may be one of three points including a point A, a point B, and a point C, as illustrated in FIG. 10. In relation to the bending structure, as illustrated in FIG. 11, it may be one of Type 1 to Type 5.

Specifically, the shorting bar SBT1 of Type 1 may include a connection part SB1 and extension parts SB2 that are connected vertically to the connection part SB1 and then extend perpendicularly. The shorting bar SBT1 may further include fastening parts SB3 formed at ends of the extension parts SB2 and fastened to the shorting pin 1102 and the metal supporter 1106.

The shorting bar SBT2 of Type 2 may include a connection part SB1 electrically connected to the metal plate S1 up to the positions of the shorting pin 1102 and the metal supporter 1106. The shorting bar SBT2 may further include the extension parts SB2 vertically connected to the connection part SB1 and disposed parallel to the shorting pin 1102 and the metal supporter 1106. The shorting bar SBT2 may further include fastening parts SB3 formed at ends of the extension parts SB2 and fastened to the shorting pin 1102 and the metal supporter 1106.

The shorting bar SBT3 of Type 3 may include a connection part SB1 and extension parts SB2 that are bent from the connection part SB1 by predetermined angles and then bent again in different directions by predetermined angles. The shorting bar SB may further include fastening parts SB3 formed at ends of the extension parts SB2 and fastened to the shorting pin 1102 and the metal supporter 1106.

The shorting bar SBT4 of Type 4 may include a connection part SB1 and extension parts SB2 that are bent from the connection part SB1 by predetermined angles. The shorting bar SB may further include fastening parts SB3 formed at ends of the extension parts SB2 and fastened to the shorting pin 1102 and the metal supporter 1106.

The shorting bar SBT5 of Type 5 may include a connection part SB1 and extension parts SB2 that are bent from the connection part SB1 by predetermined angles. The shorting bar SB may further include fastening parts SB3 formed at ends of the extension parts SB2 and fastened to the shorting pin 1102 and the metal supporter 1106.

In this regard, the shorting bar SBT1 of Type 1 and the shorting bar SBT2 of Type 2 may be connected to the point A of the metal frame S1. The shorting bar SBT3 of Type 3 and the shorting bar SBT4 of Type 4 may be connected to the point B of the metal frame S1. The shorting bar SBT5 of Type 5 may be connected to the point C of the metal frame S1.

The shorting bars SB of the Type 1 to Type 5 may operate in the entire band of 600 MHz to 3.8 GHz through performance optimization tuning. FIG. 12A is a view illustrating a voltage standing wave ratio (VSWR) of a first antenna having a shorting bar according to the present disclosure.

Figure 12:
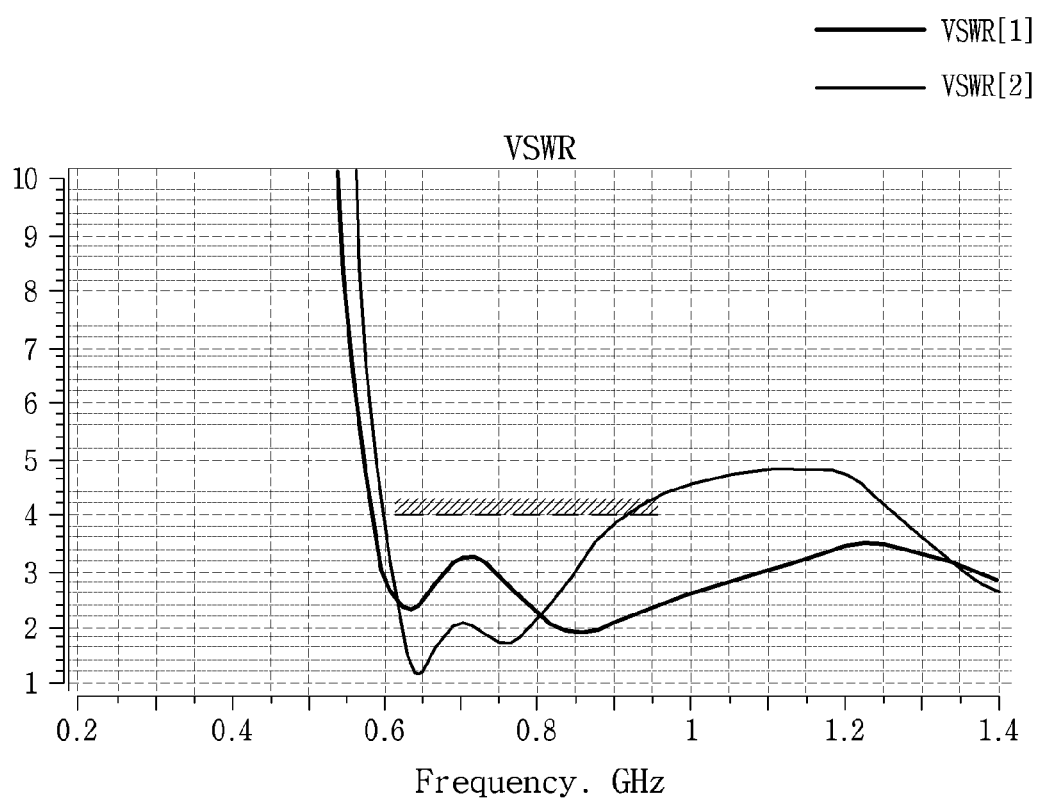
FIG. 12A is a view illustrating a voltage standing wave ratio (VSWR) of a first antenna having a shorting bar according to the present disclosure.

Referring to FIG. 12, with respect to the shorting bar SBT3 of Type 3, the first antenna may have a VSWR of 4 or less in the low band LB of 600 MHz to 960 MHz, and thus operate normally. In FIG. 12, VSWR[1] and VSWR[2] may indicate VSWR values in the first and second implementations to which the shorting bar STB3 optimized with different dimensions in the Type 3 structure is applied, respectively. Referring to the result of VSWR[1], it can be seen that an optimum VSWR value is obtained in the low band LB of 600 MHz to 960 MHz. On the other hand, referring to the results of VSWR[2], it can be seen that the VSWR value slightly increases in some bands of the lower band LB of 600 MHz to 960 MHz, but is optimal in all bands.

Therefore, different optimal shorting bars SBT3 can be applied depending on whether to operate the radiator made of the metal plate among the first antennas only in the low band LB or in all bands. This can result in providing a matching circuit for optimal antenna performance in consideration of vehicle specifications or antenna configuration.

On the other hand, the shorting bar SB, which is the broadband matching structure of Type 1 to Type 5, can be connected to both a first screw boss formed at one point in the metal plate S1 and a second screw boss formed at another point in the metal plate S1. Accordingly, the length by which the shorting bar SB is in contact with the metal plate S1 can increase, thereby improving bandwidth characteristics of the first antenna 1100.

The shorting bar SB may additionally be connected to a second screw boss SCB formed at another point in the metal plate S1, in addition to the screw boss SCB formed at one point in the metal plate S1. In this regard, one shorting bar SB may be connected to both the first screw boss and the second screw boss. Alternatively, a separate shorting bar other than the shorting bar SB connected to the first screw boss may be connected to the second screw boss.

The first antenna 1100 operating in the first frequency band, which is the low band LB, may include a metal plate S1, a lower substrate S2, a shorting pin 1102, a feeder 1105, and a metal supporter 1106.

Referring to FIGS. 10 and 11, the screw boss SCB may include a plurality of screw bosses SCB1-1 to SCB1-3 for tuning the performance of the first antenna 1100 by varying the position where the shorting bar SB is connected to the metal plate S1. Specifically, positions at which the plurality of screw bosses SCB1-1 to SCB1-3 are formed may be spaced apart by predetermined distances in one axial direction within the metal plate S1. The position where the shorting bar SB is connected to the metal plate S1 may vary depending on the positions where the plurality of screw bosses SCB1-1 to SCB1-3 are formed. This can vary impedance characteristics of the first antenna 1100. Accordingly, an operating band, radiation characteristics, and efficiency of the first antenna 1100 can vary.

Meanwhile, the second metal plate C2 may be connected to the cone radiator 1100R or a pyramid radiator 1100R2. To this end, the second metal plate C2 may include a plurality of second type screw bosses SCB2 and a plurality of third type screw bosses SCB3 to be connected to the cone radiator 1100R and the pyramid radiator 1100R2.

In one implementation, the cone radiator 1100R may be fastened to the second type screw boss SCB2 formed inside the second metal plate C2. In another implementation, the pyramid radiator 1100R2 may be fastened to the third type screw boss SCB3 formed outside the second metal plate C2. This can result in selecting the cone radiator 1100R or the pyramid radiator 1100R2 that can provide optimal performance according to different frequency band requirements for each vehicle specification or country.

As described above, the first antenna 1100 may be configured to operate in the low band LB. However, the present disclosure may not be limited thereto, and the first antenna 1100 may operate in full bands of the low band LB, the middle band MB, and the high band HB by the cone radiator 1100R or the pyramid radiator 1100R2 and the shorting bar Sb.

Meanwhile, the second antenna 1200 may be configured as a broadband antenna operating in the middle band MB and the high band HB. For example, the second antenna 1200 may include a plurality of cone antennas 1200-1 to 1200-4 including a cone radiator 1200R and a patch antenna 1201.

The plurality of cone antennas 1200-1 to 1200-4 may be implemented as 2×2 conical array antennas 1200-1 to 1200-4, but may not be limited thereto, and may be variously changed according to vehicle specifications or communication requirements. The 2×2 conical array antennas 1200-1 to 1200-4 may be disposed in a rotated state by predetermined angles with respect to one another. Specifically, the second cone antenna 1200-2 may be arranged in a rotated state by a predetermined angle to optimize isolation from the first cone antenna 1200-1. The second cone antenna 1200-2 may be arranged in a rotated state by an angle between 90 and 180 degrees with respect to the first cone antenna 1200-1. As an example, the second cone antenna 1200-2 may be disposed in a rotated state by an angle of 135 degrees with respect to the first cone antenna 1200-1.

The third cone antenna 1200-3 may be arranged in a rotated state by a predetermined angle to optimize isolation from the first cone antenna 1200-1. The third cone antenna 1200-3 may be arranged in a rotated state by an angle of 180 degrees with respect to the first cone antenna 1200-1, namely, arranged in a symmetric form.

The fourth cone antenna 1200-4 may be arranged in a rotated state by a predetermined angle to optimize isolation from the second cone antenna 1200-2. Specifically, the fourth cone antenna 1200-4 may be arranged in a rotated state by an angle of 180 degrees with respect to the second cone antenna 1200-2, namely, arranged in a symmetric form.

In this case, each of the metal patches disposed adjacent to the first to fourth cone antennas 1200-1 to 1200-4 may be disposed only in a partial region at one side of the cone antenna. In this regard, the metal patch disposed only at the partial region may be a cut rectangular patch disposed only at a region between the adjacent outer rims 1103. Such cut rectangular patches can reduce the level of interference between the adjacent cone antennas.

The baseband processor 1400 can thus perform the MIMO through the plurality of cone antennas 1200-1 to 1200-4.

On the other hand, separate from the first to fourth cone antennas 1200-1 to 1200-4, a multi-wing cone antenna that can operate in all of the low band LB, the middle band MB, and the high band HB may be disposed between the first antenna 1100 and the second antenna 1200.

In this regard, the term "multi-wing cone antenna" means an antenna in which the number of outer rims of the cone radiator connected to the metal structure of the upper substrate is plural, preferably, three or more. On the other hand, the multi-wing cone antenna with 6 or more outer rims can operate as an antenna even in the low band LB in addition to the middle band MB and the high band HB.

Accordingly, the first antenna 1100 and the multi-wing cone antenna can perform MIMO in the first frequency band, which is the LB band as a common band. On the other hand, the second antenna 200 and the multi-wing cone antenna can perform MIMO in the second frequency band, which is the MB band and the HB band as a common band.

Meanwhile, when it is necessary to simultaneously receive information from various entities such as an adjacent vehicle, RSU, or base station for autonomous driving, etc., a broad reception can be allowed through MIMO. Accordingly, the vehicle can receive different information from various entities at the same time to improve a communication capacity. This can improve the communication capacity of the vehicle through the MIMO without a bandwidth extension.

Alternatively, the vehicle may simultaneously receive the same information from various entities, so as to improve reliability for surrounding information and reduce latency. Accordingly, URLLC (Ultra Reliable Low Latency Communication) can be performed in the vehicle and the vehicle can operate as a URLLC UE. To this end, a base station performing scheduling may preferentially allocate a time slot for the vehicle operating as the URLLC UE. For this, some of specific time-frequency resources already allocated to other UEs may be punctured.

As aforementioned, the first antenna 1100 may operate in the full band of the low band LB, the middle band MB, and the high band HB by the cone radiator 1100R or the pyramid radiator 1100R2 and the shorting bar Sb. Here, the low band LB may be referred to as a first frequency band and the middle band MB and the high band HB may be referred to as a second frequency band. Accordingly, the baseband processor 1400 may perform MIMO through the first antenna 1100 and at least one of the plurality of cone antennas 1200-1 to 1200-4 in the second frequency band. Therefore, MIMO can be performed using different types of antennas spaced apart from each other by a sufficient distance. This can improve isolation between first and second signals within the same band.

The first antenna 1100 of the antenna system may operate as a radiator in the low band LB, which is the first frequency band. Also, the second antenna 1200 may operate as a radiator in the second frequency band higher than the first frequency band. Accordingly, the baseband processor 1400 may control the transceiver circuit 1250 to receive the first signal of the first frequency band through the first antenna 1100 and the second signal of the second frequency band through the second antenna 1200. Therefore, the baseband processor 1400 can perform carrier aggregation (CA) through a band in which the first frequency band and the second frequency band are combined with each other. When it is necessary to receive a large amount of data for autonomous driving and the like, a broadband reception can be allowed through the CA.

Accordingly, eMBB (Enhanced Mobile Broad Band) communication can be performed in the vehicle and the vehicle can operate as an eMBB UE. To this end, a base station performing scheduling may preferentially allocate broadband frequency resources for the vehicle operating as the eMBB UE. For this purpose, CA may be performed on extra frequency bands except for frequency resources already allocated to other UEs.

Figure 13:
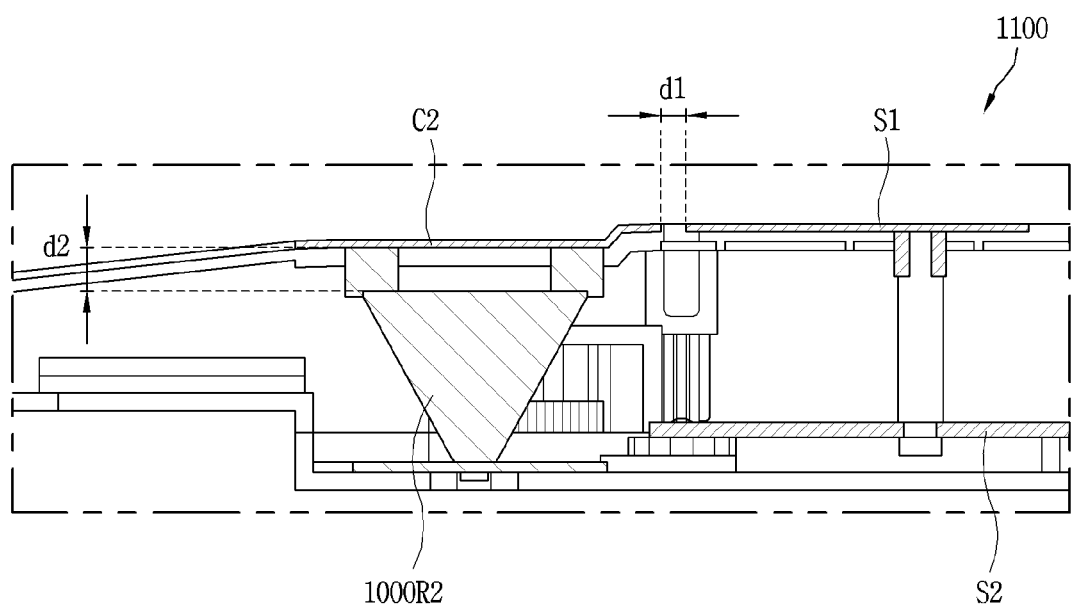
FIG. 13 is a view illustrating a lateral structure of an antenna system having a plurality of metal plates using the exterior of a module according to the present disclosure.

Hereinafter, a description will be given of a lateral structure of an antenna system having a plurality of metal plates using the exterior of a module. FIG. 13 is a view illustrating a lateral structure of an antenna system having a plurality of metal plates using the exterior of a module according to the present disclosure.

Referring to FIGS. 6A, 6B, 9A to 9C, 11 and 13, the first antenna 1100 may include the metal plate S1 and the second metal plate C2. For example, the metal plate S1 of the first antenna 1100 may be connected to the shorting pin 1102 and the feeder 1105. In addition, the metal plate S1 of the first antenna 1100 may be connected to the shorting bar SB to perform a broadband operation. The second metal plate C2 may be spaced apart from the metal plate S1 by a predetermined distance, that is, d1, so that the first antenna 1100 can operate in a broad band by coupling with a signal radiated from the metal plate S1.

In this regard, the distance d1 between the metal plate S1 and the second metal plate C2 may be about 3 mm. However, the distance d1 may not be limited thereto and may vary for optimizing antenna performance. Meanwhile, a metal guide hole may be used to tune the distance d1 between the metal plate S1 and the second metal plate C2. To this end, the metal plate S1 and the second metal plate C2 may be configured in an integrated structure with each other, other than a separated structure. Meanwhile, metal guide holes may be disposed between the metal plate S1 and the second metal plate C2 such that the metal plate S1 and the second metal plate C2 are spaced apart from each other.

Specifically, the metal guide holes may be disposed at predetermined distances in horizontal and vertical directions. A diameter of each of the metal guide holes may be set to the distance d1 between the metal plate S1 and the second metal plate C2. Accordingly, even when the metal plate S1 and the second metal plate C2 are integrally formed with each other, they can have the same or similar electrical characteristics, by the metal guide holes, as the electrical characteristics in the separated structure by the predetermined distance d1.

Meanwhile, the second metal plate C2 of the first antenna 1100 may be coupled to the cone radiator 1100R, 1100R2. In this regard, the second metal plate C2 may be spaced apart from the radiator 1100R, 1100R2 by the first cover CV1 to improve antenna performance. In addition, the second metal plate C2 may be directly connected to the thicker second metal plate C2 without the first cover CV1 made of a dielectric material. This can increase the overall antenna height, thereby improving antenna performance. In this regard, the second metal plate C2 may be spaced apart from the radiator 1100R, 1100R2 by a predetermined distance, that is, d2 by the first cover CV1 or other structure, to optimize antenna performance.

On the other hand, the lower substrate on which the shorting pin 1102 and the feeder 1105 are disposed and the second lower substrate on which the cone radiator 1100R, 1100R2 is disposed may be connected or fastened to a heat sink, to alleviate a heat generation phenomenon of the antenna system 1000.

Meanwhile, a bracket coupling portion for coupling the antenna system to the vehicle may be disposed on an outer region where the antenna is disposed. However, the present disclosure may not be limited thereto, and a planar antenna may be disposed on an inclined surface having a predetermined inclination at an outer region of the antenna system 1000.

With respect to an antenna height, a position at which the metal plate S1 is disposed may be higher than a position at which the second metal plate C2 is disposed. Meanwhile, a lower substrate, to which the lower aperture of the cone radiator 1100R, 1100R2 is connected with being spaced apart from the second metal plate C2 may be located to be lower than a lower substrate of the metal plate S1. Accordingly, a predetermined height of the cone radiator 1100R, 1100R2 can be secured despite the second metal plate C2 is disposed at a lower position. This can increase the antenna height including the cone radiator 1100R, 1100R2, thereby improving antenna performance.

As an example, the hole antenna height may be 25 mm such that the antenna can be mounted on a vehicle roof or roof frame. And, the total height of the antenna system including the antenna and the entire mechanical structure may be about 28 mm.

The foregoing description has been given of the broadband antenna system mounted in the vehicle according to one aspect. Hereinafter, a vehicle equipped with a broadband antenna system according to another aspect will be described. In this regard, the foregoing description of the antenna system may be applied, and the description of the vehicle in which the antenna system is mounted may also be applied to the aforementioned antenna system.

The broadband antenna system according to the present disclosure may be mounted in the vehicle in the structure illustrated in FIGS. 2A to 2C. That is, the broadband antenna system mounted to the vehicle may be mounted on a roof of the vehicle, inside the roof, or inside a roof frame, as illustrated in FIGS. 2A to 2C.

FIGS. 14A to 14C are block diagrams illustrating a broadband antenna system and a vehicle in which the antenna system is mounted according to the present disclosure. Referring to FIGS. 14A to 14C, a vehicle in which the broadband antenna system is mounted may have the antenna system 1000 mounted thereto. The antenna system 1000 may perform short-range communication, wireless communication, V2X communication, and the like by itself or through the communication apparatus 400. To this end, the baseband processor 1400 may be configured to receive signals from or transmit signals to adjacent vehicles, RSUs, and base stations through the antenna system 1000.

Alternatively, the baseband processor 1400 may be configured to receive signals from or transmit signals to adjacent vehicles, RSUs, and base stations through the communication apparatus 400. Here, the information related to adjacent objects may be acquired through the object detecting apparatus such as the camera 331, the radar 332, the LiDar 333, and the sensors 334 and 335 of the vehicle 300. Alternatively, the baseband processor 1400 may be configured to receive signals from or transmit signals to adjacent vehicles, RSUs, and base stations through the communication apparatus 400 and the antenna system 1000.

FIGS. 14A to 14C are different from FIGS. 8A to 8C in that the first antennas 1100, 1100b, 1100c, 1100', 1100b', 1100c' all operate in the middle band MB and the high band HB in addition to the low band LB. To this end, the first antennas 1100, 1100b, 1100c, 1100', 1100b', and 1100c' of FIGS. 14A to 14C may include the second metal plate C2 in addition to the metal plate S1. The feeder may be coupled directly to the second metal plate C2 or through the radiator, and the screw bosses SCB1-1, SCB1-2, and SCB1-3 may be formed in the metal plate S1.

In addition, the first antennas 1100, 1100b, 1100c, 1100', 1100b', and 1100c' of FIGS. 14A to 14C may occupy a wider space for a broadband operation. Accordingly, the number of cone antennas constituting the second antennas 1200 and 1200' may be limited to two, respectively.

FIG. 14A illustrates the antenna system 1000 that includes a patch-type metal plate S1. Referring to FIG. 14A, the metal plate S1 and the second metal plates C2 disposed on the left and right sides of the antenna system 1000 may configure the first antennas 1100 and 1100'.

The second antennas 1200 and 1200' may be disposed adjacent to the first antennas 1100 and 1100'. As an example, the second antenna 1200 may include two cone antennas 1200-1 and 1200-2. In addition, the second antenna 1200' may include two cone antennas 1200'-1 and 1200'-2 spaced apart from the two cone antennas 1200-1 and 1200-2 by a predetermined distance. However, the present disclosure may not be limited thereto and may vary depending on applications. The first antennas 1100 and 1100' may be denoted by L+M+H and the second antennas 1200 and 1200' may be denoted by M+H. The second antennas 1200 and 1200' may include the cone antennas that are rotated by predetermined angles. Meanwhile, an upper aperture of each cone antenna may be implemented in a multi-wing structure corresponding to outer rims for fastening with the upper substrate and for a broadband operation. As illustrated, a wing angle of each cone antenna may be substantially about 120 degrees.

Accordingly, when two wing structures are provided for each cone antenna at an interval of about 120 degrees, structural stability of the cone antenna can be achieved and the position of the shorting pin can be variably implemented. In addition, a metal patch disposed adjacent to the cone antenna may be implemented in two structures according to the shape of the wing. That is, a metal patch of a first structure may have a portion removed in a circular shape to be arranged along two wings with an interval of 120 degrees, and the shorting pin may be connected at a position offset from a center. On the other hand, a metal patch of a second structure may have a portion removed in a circular shape to be arranged along two wings with an interval of 240 degrees, and the shorting pin may be located at a center.

Meanwhile, the antenna system may further include a transceiver circuit 1250 configured to apply a signal to at least one of the first antennas 1100 and 1100' and the second antennas 1200 and 1200'. In addition, the baseband processor 1400 may apply a signal to at least one of the first antennas 1100 and 1100' and the second antennas 1200 and 1200', so as to control the transceiver circuit 1250 to perform MIMO, diversity and/or CA in the first frequency band and/or the second frequency band. When performing the MIMO operation, the baseband processor 1400 may use one of the second antennas 1200 and one of the second antennas 1200' in the second frequency band, which is the low band LB, in order to reduce an interference level. In particular, the interference due to a distance between elements and different shapes can be reduced by using an element disposed at an upper side of the second antennas 1200 and an element disposed at a lower side of the second antennas 1200'.

Meanwhile, FIG. 14B illustrates the antenna system 1000 that uses the metal plate S1 coupled to a circular cone. Referring to FIG. 14B, the metal plate S1 and the second metal plates C2 disposed on the left and right sides of the antenna system 1000 may configure the first antennas 1100b and 1100b'. Here, the circular cone antenna may mean that an upper aperture is circular, but it is not necessarily limited to the circular shape and may be expandable to include any polygonal structure.

The second antennas 1200 and 1200' may be disposed adjacent to the first antennas 1100b and 1100b'. As an example, the second antenna 1200 may include two cone antennas 1200-1 and 1200-2. In addition, the second antenna 1200' may include two cone antennas 1200'-1 and 1200'-2 spaced apart from the two cone antennas 1200-1 and 1200-2 by a predetermined distance. However, the present disclosure may not be limited thereto and may vary depending on applications. The first antennas 1100 and 1100' may be denoted by L+M+H and the second antennas 1200 and 1200' may be denoted by M+H. The second antennas 1200 and 1200' may include the cone antennas that are rotated by predetermined angles. Meanwhile, an upper aperture of each cone antenna may be implemented in a multi-wing structure corresponding to outer rims for fastening with the upper substrate and for a broadband operation. As illustrated, a wing angle of each cone antenna may be substantially about 120 degrees.

Meanwhile, the antenna system may further include the transceiver circuit 1250 configured to apply a signal to at least one of the first antennas 1100b and 1100b' and the second antennas 1200 and 1200'. In addition, the baseband processor 1400 may apply a signal to at least one of the first antennas 1100b and 1100b' and the second antennas 1200 and 1200', so as to control the transceiver circuit 1250 to perform MIMO, diversity and/or CA in the first frequency band and/or the second frequency band. When performing the MIMO operation, the baseband processor 1400 may use one of the second antennas 1200 and one of the second antennas 1200' in the second frequency band, which is the low band LB, in order to reduce an interference level. In particular, the interference due to a distance between elements and different shapes can be reduced by using an element disposed at an upper side of the second antennas 1200 and an element disposed at a lower side of the second antennas 1200'.

Meanwhile, FIG. 14C illustrates the antenna system 1000 that uses the metal plate S1 coupled to a rectangular cone. Referring to FIG. 14C, the metal plate S1 and the second metal plates C2 disposed on the left and right sides of the antenna system 1000 may configure the first antennas 1100c and 1100c'. Here, the rectangular cone antenna may mean that an upper aperture is rectangular, but it is not necessarily limited to the rectangular shape and may be expandable to include any polygonal structure. Since both upper and lower apertures have a rectangular shape and the lower aperture is smaller than the upper aperture, it may be referred to as an inverted pyramid structure.

The second antennas 1200 and 1200' may be disposed adjacent to the first antennas 1100c and 1100c'. As an example, the second antenna 1200 may include two cone antennas 1200-1 and 1200-2. In addition, the second antenna 1200' may include two cone antennas 1200'-1 and 1200'-2 spaced apart from the two cone antennas 1200-1 and 1200-2 by a predetermined distance. However, the present disclosure may not be limited thereto and may vary depending on applications. The first antennas 1100c and 1100c' may be denoted by L+M+H and the second antennas 1200 and 1200' may be denoted by M+H. The second antennas 1200 and 1200' may include the cone antennas that are rotated by predetermined angles. Meanwhile, an upper aperture of each cone antenna may be implemented in a multi-wing structure corresponding to outer rims for fastening with the upper substrate and for a broadband operation. As illustrated, a wing angle of each cone antenna may be substantially about 120 degrees.

Meanwhile, the antenna system may further include the transceiver circuit 1250 configured to apply a signal to at least one of the first antennas 1100c and 1100c' and the second antennas 1200 and 1200'. In addition, the baseband processor 1400 may apply a signal to at least one of the first antennas 1100c and 1100c' and the second antennas 1200 and 1200', so as to control the transceiver circuit 1250 to perform MIMO, diversity and/or CA in the first frequency band and/or the second frequency band. When performing the MIMO operation, the baseband processor 1400 may use one of the second antennas 1200 and one of the second antennas 1200' in the second frequency band, which is the low band LB, in order to reduce an interference level. In particular, the interference due to a distance between elements and different shapes can be reduced by using an element disposed at an upper side of the second antennas 1200 and an element disposed at a lower side of the second antennas 1200'.

Meanwhile, referring to FIGS. 1 to 14C, the vehicle 300 including the antenna system 1000 may include the first antenna 1100, the second antenna 1200, the transceiver circuit 1250, and the baseband processor 1400.

The first antenna 1100 may include the metal plate S1, the lower substrate S2, the feeder 1105, and the shorting pin 1102. The metal plate S1 may define a part of the exterior of the antenna system 1000 and may act as a radiator. The lower substrate S2 may be disposed under the metal plate, the feeder 1105 may be disposed on the front surface of the lower substrate S2, and a signal may be transmitted to the metal plate S1 through the metal supporter 1106. The shorting pin 1102 may connect the ground of the lower substrate S2 and the metal plate S1.

The second antenna 1200 may be disposed in the antenna system separately from the first antenna. In this regard, the first antenna 1100 may operate as a radiator in the low band LB as the first frequency band, and the second antenna 1200 may operate as a radiator in the second frequency band higher than the first frequency band.

Therefore, the second antenna 1200 can be configured as a broadband antenna operating in the middle band MB and the high band HB. For example, the second antenna 1200 may include a plurality of cone antennas 1200-1 to 1200-4 including a cone radiator 1200R and a patch antenna 1201.

The plurality of cone antennas 1200-1 to 1200-4 may be implemented as 2×2 conical array antennas 1200-1 to 1200-4, but may not be limited thereto, and may be variously changed according to vehicle specifications or communication requirements. The 2×2 conical array antennas 1200-1 to 1200-4 may be disposed in a rotated state by predetermined angles with respect to one another. Specifically, the second cone antenna 1200-2 may be arranged in a rotated state by a predetermined angle to optimize isolation from the first cone antenna 1200-1. The second cone antenna 1200-2 may be arranged in a rotated state by an angle between 90 and 180 degrees with respect to the first cone antenna 1200-1. As an example, the second cone antenna 1200-2 may be disposed in a rotated state by an angle of 135 degrees with respect to the first cone antenna 1200-1.

The third cone antenna 1200-3 may be arranged in a rotated state by a predetermined angle to optimize isolation from the first cone antenna 1200-1. The third cone antenna 1200-3 may be arranged in a rotated state by an angle of 180 degrees with respect to the first cone antenna 1200-1, namely, arranged in a symmetric form.

The fourth cone antenna 1200-4 may be arranged in a rotated state by a predetermined angle to optimize isolation from the second cone antenna 1200-2. Specifically, the fourth cone antenna 1200-4 may be arranged in a rotated state at an angle of 180 degrees with respect to the second cone antenna 1200-2, namely, arranged in a symmetric form.

In this case, each of the metal patches disposed adjacent to the first to fourth cone antennas 1200-1 to 1200-4 may be disposed only on a partial region at one side of the cone antenna. In this regard, the metal patch disposed only at the partial region may be a cutting rectangular patch disposed only at a region between the adjacent outer rims 1103. Such cut rectangular patches can reduce the level of interference between the adjacent cone antennas.

Depending on applications, separate from the first to fourth cone antennas 1200-1 to 1200-4, a multi-wing cone antenna that can operate in all of the low band LB, the middle band MB, and the high band HB may be disposed between the first antenna 1100 and the second antenna 1200.

In this regard, the term "multi-wing cone antenna" means an antenna in which the number of outer rims of the cone radiator connected to the metal structure of the upper substrate is plural, preferably, three or more. As illustrated in FIG. 8, the multi-wing cone antenna with 6 or more outer rims can operate as an antenna even in the low band LB in addition to the middle band MB and the high band HB.

Accordingly, the first antenna 1100 and the multi-wing cone antenna can perform MIMO in the first frequency band, which is the LB. On the other hand, the second antenna 200 and the multi-wing cone antenna can perform MIMO in the second frequency band, which is the MB band and the HB band.

The baseband processor 1400 may control the transceiver circuit 1250 to receive the first signal of the first frequency band through the first antenna 1100 and the second signal of the second frequency band through the second antenna 1200. Therefore, the baseband processor 1400 can perform carrier aggregation (CA) through a band in which the first frequency band and the second frequency band are combined with each other.

The transceiver circuit 1250 may be controlled to radiate a signal through at least one of the first antenna and the second antenna. The baseband processor 1400 may perform communication with at least one of an adjacent vehicle, a Road Side Unit (RSU), and a base station through the transceiver circuit 1250.

On the other hand, the first antenna 1100 may further include the second metal plate C2 that is disposed adjacent to the metal plate S1 for coupling of a signal from the metal plate S1, so that the first antenna 1100 can operate in a broad band.

The metal plate S1 of the first antenna 1100 may be connected to the cone radiator 1100R, 1100R2 disposed under the metal plate S2. The first antenna 1100 may further include the first cover CV1 disposed between the second metal plate and the cone radiator. Accordingly, the second metal plate C2 and the cone radiator 1100R, 1100R2 can be separated from each other by the first cover CV1. This can increase the height of the first antenna 1100 by the first cover CV1, so that the performance of the first antenna 1100 can be improved.

The first antenna 1100 may further include the shorting bar SB, SBT1 to SBT5 configured to connect the feeder 1105 and the shorting pin 1102 disposed on the metal plate S1 for the broadband operation. In this case the shorting bar SB, SBT1 to SBT5 may be connected to the metal supporter 1106 of the feeder 1105 and the shorting pin 1102 and may additionally be connected to one point in the metal plate S1.

The aforementioned method for implementing the antenna using the metal of the exterior of the module may have the following differences compared to the related art.

When the metal of the exterior of the module is used as an antenna, the antenna height can increase more than a case where it is not. For example, when the metal of the exterior of the module is used as an antenna, the height of the antenna can be increased by about 3 mm.

This can secure an optimal antenna design space in a given mechanical structure for the antenna. In addition, the antenna height can be determined by adding 2 mm which is a thickness of an outer cover of the antenna module for vehicle and 1 mm which is an antenna design gap. Accordingly, compared to the case where an inside of a case is used as an antenna, the antenna using the metal of the exterior of the module can provide an effect of increasing the height of 3 mm. Therefore, in the antenna system using the metal of the exterior of the antenna module as an antenna, the antenna performance can be improved by about 2 to 5 dB.

The structure of the antenna can be divided into a fixed part for the external metal of the module and a variable part of the internal connection structure, such that the antenna module itself can operate as an antenna when the antenna module is mounted to the vehicle.

In the above, the antenna system mounted in the vehicle and the vehicle equipped with the antenna system have been described. Hereinafter, technical effects of an antenna structure using the exterior of a module in an antenna system mounted in a vehicle and a vehicle equipped with the antenna system will be described.

According to an implementation, antenna performance can be improved while maintaining the height of an antenna system mounted in a vehicle to be a predetermined level or lower, by using the exterior of a metal of an antenna module.

According to an implementation, a structure for mounting an antenna system, which can operate in a broad band, in a vehicle can be provided to support various communication systems by implementing a low band (LB) antenna and other antennas in one antenna module.

According another aspect, a planar antenna of various structures which can operate in a low band LB can be provided by coupling a shorting bar as well as a shorting pin to a metal plate.

According to another aspect, a planar antenna of various structures which can operate in a low band LB can provide optimized antenna performance according to various structures of a shorting bar, by coupling the shorting bar to a metal plate in the various structures and shapes.

According to the present disclosure, the antenna system can be optimized with different antennas in the low band LB and other bands. This can result in arranging the antenna system with optimal configuration and performance in a roof frame of the vehicle.

According to the present disclosure, the antenna system of the vehicle can implement MIMO and diversity operations using a plurality of antennas in specific bands.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

In relation to the aforementioned present disclosure, design and operations of a plurality of antennas of an antenna system mounted in a vehicle and a configuration performing the control of those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An antenna system mounted in a vehicle, the system comprising:
   a metal plate defining a part of the exterior of the antenna system, having a central portion and two side portions in one axial direction and operating as a radiator;
   a lower substrate disposed under the metal plate;
   a feeder disposed on a front surface of the lower substrate and configured to transmit a signal to the metal plate through a metal supporter;
   a first antenna comprising a shorting pin configured to connect a ground of the lower substrate and the metal plate;
   a second antenna disposed in the antenna system, separately from the first antenna; and
   a transceiver circuit configured to control a signal to be radiated through at least one of the first antenna or the second antenna,
   wherein a height from the lower substrate to the central portion of the metal plate is formed to be lower than a height from the lower substrate to at least one side portion of the metal plate.

2. The antenna system of claim 1, wherein the first antenna further comprises:
   a second metal plate disposed adjacent to the metal plate for coupling of a signal from the metal plate, the second metal plate configured such that the first antenna operates in a broad band.

3. The antenna system of claim 2, wherein the second metal plate is connected to a cone radiator disposed under the second metal plate.

4. The antenna system of claim 3, further comprising a first cover disposed between the second metal plate and the cone radiator to increase a height of the first antenna as the second metal plate is separated from the cone radiator, so as to improve performance of the first antenna.

5. The antenna system of claim 3, further comprising a second cover disposed to enclose the cone radiator under the cone radiator.

6. The antenna system of claim 4, wherein the second metal plate, the first cover, and outer rims integrally formed with the cone radiator are connected together by screws coupled from an upper portion of the second metal plate.

7. The antenna system of claim 5, wherein the second metal plate, outer rims integrally formed with the cone radiator, and the second cover are connected together by screws coupled from an upper portion of the second metal plate.

8. The antenna system of claim 3, wherein the second metal plate and outer rims integrally formed with the cone radiator are connected to each other by screws coupled from an upper portion of the second metal plate, and
   wherein an upper aperture of the cone radiator is covered by the second metal plate without a dielectric.

9. The antenna system of claim 1, further comprising a shorting bar configured to connect the shorting pin and the feeder disposed on the metal plate,
   wherein the shorting bar is connected to the metal supporter of the feeder and the shorting pin, and to one point in the metal plate.

10. The antenna system of claim 9, wherein the shorting bar is connected to a screw boss formed on the one point in the metal plate.

11. The antenna system of claim 9, wherein the shorting bar comprises:
    a connection part connected to the one point in the metal plate;
    extension parts formed by being bent from the connection part at predetermined angles; and
    fastening parts formed at ends of the extension parts to be fastened to the shorting pin and the metal supporter.

12. The antenna system of claim 2, wherein a position where the metal plate is disposed is higher than a position where the second metal plate is disposed, and
    a position where a lower substrate connected with a lower aperture of a cone radiator with being spaced apart from the second metal plate is disposed is lower than a position where a lower plate of the metal plate is disposed, so as to secure a predetermined height of the cone radiator.

13. The antenna system of claim 2, wherein the second metal plate is connected to a cone radiator or a pyramid radiator, and
    wherein the second metal plate comprises a plurality of second type screw bosses and a plurality of third type screw bosses to be connected with the cone radiator and the pyramid radiator.

14. The antenna system of claim 1, wherein the second antenna comprises a plurality of cone antennas including cone radiators and patch antennas,
    wherein the antenna system further comprises a baseband processor configured to perform Multi-Input/Multi-Output (MIMO) through the plurality of cone antennas, and
    wherein the baseband processor performs MIMO through the first antenna and at least one of the plurality of cone antennas.

15. The antenna system of claim 1, wherein the first antenna operates as a radiator in a low band as a first frequency band, and the second antenna operates as a radiator in a second frequency band higher than the first frequency band, and
    wherein the antenna system further comprises a baseband processor configured to perform Carrier Aggregation (CA) by receiving a first signal of the first frequency band through the first antenna and a second signal of the second frequency band through the second antenna.

16. A vehicle having an antenna system, the vehicle comprising:

a metal plate defining a part of the exterior of the antenna system and operating as a radiator;

a lower substrate disposed under the metal plate;

a feeder disposed on a front surface of the lower substrate and configured to transmit a signal to the metal plate through a metal supporter;

a first antenna comprising a shorting pin configured to connect a ground of the lower substrate and the metal plate;

a second antenna disposed in the antenna system, separately from the first antenna; and a transceiver circuit configured to control a signal to be radiated through at least one of the first antenna or the second antenna; and a baseband processor configured to communicate with at least one of an adjacent vehicle, a Road Side Unit (RSU), or a base station through the transceiver circuit, wherein the first antenna further comprises a second metal plate disposed adjacent to the metal plate for coupling of a signal from the metal plate, the second metal plate configured such that the first antenna operates in a broad band.

17. The vehicle of claim 16, wherein the second metal plate is connected to a cone radiator disposed under the second metal plate, and wherein the first antenna further comprises a first cover disposed between the second metal plate and the cone radiator to increase a height of the first antenna as the second metal plate is separated from the cone radiator, so as to improve performance of the first antenna.

18. The vehicle of claim 16, further comprising a shorting bar configured to connect the shorting pin and the feeder disposed on the metal plate, wherein the shorting bar is connected to the metal supporter of the feeder and the shorting pin, and additionally to one point in the metal plate.

19. The vehicle of claim 16, wherein the first antenna operates as a radiator in a low band as a first frequency band, and the second antenna operates as a radiator in a second frequency band higher than the first frequency band, and wherein the vehicle further comprises a baseband processor configured to perform Carrier Aggregation (CA) by receiving a first signal of the first frequency band through the first antenna and a second signal of the second frequency band through the second antenna.

* * * * *